United States Patent
Zhu et al.

(10) Patent No.: US 9,232,502 B2
(45) Date of Patent: Jan. 5, 2016

(54) METHOD AND SYSTEM FOR UPLINK MULTI-USER MULTIPLE-INPUT-MULTIPLE-OUTPUT COMMUNICATION IN WIRELESS NETWORKS

(71) Applicant: SAMSUNG ELECTRONICS CO., LTD., Suwon, Gyeonggi-Do (KR)

(72) Inventors: Chunhui Zhu, San Jose, CA (US); Youngsoo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 454 days.

(21) Appl. No.: 13/664,602

(22) Filed: Oct. 31, 2012

(65) Prior Publication Data

US 2014/0119288 A1    May 1, 2014

(51) Int. Cl.
*H04W 72/04* (2009.01)
*H04W 74/08* (2009.01)

(52) U.S. Cl.
CPC ...... *H04W 72/0406* (2013.01); *H04W 74/0816* (2013.01)

(58) Field of Classification Search
None
See application file for complete search history.

(56) References Cited

U.S. PATENT DOCUMENTS

| | | | |
|---|---|---|---|
| 5,615,212 A | 3/1997 | Ruszczyk et al. | |
| 5,886,993 A | 3/1999 | Ruszczyk et al. | |
| 6,198,728 B1 | 3/2001 | Hulyalkar et al. | |
| 6,795,421 B1 | 9/2004 | Heinonen et al. | |
| 6,807,158 B2 | 10/2004 | Krishnamurthy et al. | |
| 6,813,277 B2 | 11/2004 | Edmon et al. | |
| 6,868,072 B1 | 3/2005 | Lin et al. | |
| 6,925,064 B2 | 8/2005 | Hester et al. | |
| 7,079,812 B2 | 7/2006 | Miller et al. | |
| 7,088,702 B2 | 8/2006 | Shvodian | |
| 7,127,254 B2 | 10/2006 | Shvodian et al. | |
| 7,184,767 B2 | 2/2007 | Gandolfo | |
| 7,197,025 B2 | 3/2007 | Chuah | |
| 7,251,235 B2 | 7/2007 | Wentink | |
| 7,280,518 B2 | 10/2007 | Montano et al. | |
| 7,280,801 B2 | 10/2007 | Dahl | |
| 7,339,916 B2 | 3/2008 | Kwon et al. | |
| 7,356,341 B2 | 4/2008 | Nanda | |

(Continued)

OTHER PUBLICATIONS

IEEE P802.11e/D13.0, "IEEE Standard for Information Technology—Telecommunications and Information Exchange Between Systems—Local and Metropolitan Area Networks—Specific Requirements: Part 11: Wireless LAN Medium Access Control (MAC) and Physical Layer (PHY) Specifications: Amendment: Medium Access Control (MAC) Quality of Service (QoS) Enhancements," LAN/MAN Committee, IEEE Computer Society, Jan. 2005, IEEE, New York, NY, pp. i-182, United States.

(Continued)

*Primary Examiner* — Robert C Scheibel
(74) *Attorney, Agent, or Firm* — Sherman IP LLP; Kenneth L. Sherman; Steven Laut

(57) ABSTRACT

Wireless communication in a wireless network comprises a wireless station obtaining a transmission opportunity period (TXOP) for communicating with an access point (AP) over a wireless communication channel. The wireless station sends an announcement to the AP to share the transmission opportunity period with at least another wireless station, as a multi-user transmission opportunity period for simultaneously transmitting data from said wireless stations to the AP on multiple uplink (UL) spatial streams over the wireless channel.

36 Claims, 26 Drawing Sheets

(56) References Cited

U.S. PATENT DOCUMENTS

| | | |
|---|---|---|
| 7,359,398 B2 | 4/2008 | Sugaya |
| 7,385,943 B2 | 6/2008 | Niddam |
| 7,388,833 B2 | 6/2008 | Yuan et al. |
| 7,400,899 B2 | 7/2008 | Shin et al. |
| 7,447,174 B2 | 11/2008 | Joshi |
| 7,447,180 B2 | 11/2008 | Jeong et al. |
| 7,474,686 B2 | 1/2009 | Ho |
| 7,480,266 B2 | 1/2009 | Murty et al. |
| 7,486,650 B2 | 2/2009 | Trainin |
| 7,539,930 B2 | 5/2009 | Ginzburg et al. |
| 7,545,771 B2 | 6/2009 | Wentink et al. |
| 7,561,510 B2 | 7/2009 | Imamura et al. |
| 7,570,656 B2 | 8/2009 | Raphaeli et al. |
| 7,590,078 B2 | 9/2009 | Nanda |
| 7,623,542 B2 | 11/2009 | Yonge et al. |
| 7,634,275 B2 | 12/2009 | Odman |
| 7,664,030 B2 | 2/2010 | Sugaya |
| 7,664,132 B2 | 2/2010 | Benveniste |
| 7,680,150 B2 | 3/2010 | Liu et al. |
| 7,684,380 B2 | 3/2010 | Odman |
| 7,697,448 B2 | 4/2010 | Karaoguz |
| 7,787,487 B2 | 8/2010 | Liu |
| 7,804,804 B2 | 9/2010 | Sugaya et al. |
| 7,860,054 B2 | 12/2010 | Benveniste |
| 7,881,340 B2 | 2/2011 | Farrag et al. |
| 7,924,805 B2 | 4/2011 | Nishibayashi et al. |
| 7,944,897 B2 | 5/2011 | Shao et al. |
| 7,974,261 B2 | 7/2011 | Lane et al. |
| 8,068,449 B2 | 11/2011 | Benveniste |
| 8,072,961 B2 | 12/2011 | Takano |
| 8,089,946 B2 | 1/2012 | Brommer |
| 8,107,424 B2 | 1/2012 | Li et al. |
| 8,107,993 B2 | 1/2012 | Toshimitsu et al. |
| 8,179,867 B2 | 5/2012 | Seok |
| 8,194,626 B2 | 6/2012 | Moorti et al. |
| 8,437,317 B2 | 5/2013 | Jang et al. |
| 8,532,221 B2 | 9/2013 | Liu et al. |
| 8,649,358 B2 | 2/2014 | Gong et al. |
| 8,976,741 B2 | 3/2015 | Wentink |
| 8,989,106 B2 | 3/2015 | Abraham et al. |
| 2003/0003905 A1 | 1/2003 | Shvodian |
| 2003/0137970 A1 | 7/2003 | Odman |
| 2003/0137993 A1 | 7/2003 | Odman |
| 2003/0214967 A1 | 11/2003 | Heberling |
| 2004/0047319 A1 | 3/2004 | Elg |
| 2004/0214571 A1 | 10/2004 | Hong |
| 2004/0218683 A1 | 11/2004 | Batra et al. |
| 2004/0264475 A1 | 12/2004 | Kowalski |
| 2005/0058151 A1 | 3/2005 | Yeh |
| 2005/0130634 A1 | 6/2005 | Godfrey |
| 2005/0135318 A1 | 6/2005 | Walton et al. |
| 2005/0232275 A1 | 10/2005 | Stephens |
| 2006/0002428 A1 | 1/2006 | Trainin |
| 2006/0050742 A1 | 3/2006 | Grandhi et al. |
| 2006/0166683 A1 | 7/2006 | Sharma et al. |
| 2006/0176908 A1 | 8/2006 | Kwon et al. |
| 2006/0193279 A1 | 8/2006 | Gu et al. |
| 2007/0280180 A1 | 12/2007 | Dalmases et al. |
| 2008/0159208 A1 | 7/2008 | Kloker et al. |
| 2008/0279204 A1 | 11/2008 | Pratt, Jr. et al. |
| 2009/0052389 A1 | 2/2009 | Qin et al. |
| 2009/0086706 A1 | 4/2009 | Huang et al. |
| 2009/0092086 A1 | 4/2009 | Lee et al. |
| 2009/0275292 A1 | 11/2009 | Chang |
| 2009/0285163 A1 | 11/2009 | Zhang et al. |
| 2009/0323611 A1 | 12/2009 | Singh et al. |
| 2010/0002639 A1 | 1/2010 | Qin et al. |
| 2010/0046453 A1* | 2/2010 | Jones et al. .............. 370/329 |
| 2010/0046518 A1 | 2/2010 | Takagi et al. |
| 2010/0220601 A1 | 9/2010 | Vermani et al. |
| 2010/0310003 A1 | 12/2010 | Lauer et al. |
| 2011/0002319 A1 | 1/2011 | Husen et al. |
| 2011/0064013 A1* | 3/2011 | Liu et al. ................. 370/312 |
| 2011/0090855 A1* | 4/2011 | Kim ........................ 370/329 |
| 2011/0176627 A1 | 7/2011 | Wu et al. |
| 2011/0235513 A1 | 9/2011 | Ali |
| 2011/0255618 A1 | 10/2011 | Zhu et al. |
| 2011/0268054 A1 | 11/2011 | Abraham et al. |
| 2011/0268094 A1* | 11/2011 | Gong et al. .............. 370/338 |
| 2011/0317630 A1 | 12/2011 | Zhu et al. |
| 2012/0008490 A1 | 1/2012 | Zhu |
| 2012/0060075 A1* | 3/2012 | Gong et al. .............. 714/776 |
| 2012/0082200 A1 | 4/2012 | Verikoukis et al. |
| 2012/0087358 A1 | 4/2012 | Zhu et al. |
| 2012/0140615 A1 | 6/2012 | Gong |
| 2012/0218947 A1 | 8/2012 | Merlin et al. |
| 2012/0230317 A1* | 9/2012 | Kim et al. ................ 370/338 |
| 2012/0314694 A1 | 12/2012 | Hsieh |
| 2013/0229996 A1 | 9/2013 | Wang et al. |
| 2013/0259017 A1* | 10/2013 | Zhang et al. ............. 370/338 |
| 2013/0286959 A1* | 10/2013 | Lou et al. ................. 370/329 |
| 2013/0301551 A1* | 11/2013 | Ghosh et al. ............. 370/329 |
| 2014/0010144 A1 | 1/2014 | Liu et al. |
| 2014/0126509 A1* | 5/2014 | You ........................... 370/329 |
| 2014/0269544 A1* | 9/2014 | Zhu et al. ................. 370/329 |
| 2014/0328262 A1* | 11/2014 | Sampath et al. ......... 370/329 |
| 2015/0071051 A1 | 3/2015 | Zhu et al. |

OTHER PUBLICATIONS

IEEE Wireless LAN Edition, "A Compilation Based on IEEE Std. 802.11TM-1999 (R2003) and Its Amendments," IEEE Press, 2003, pp. i-678, United States.

Mujtaba, S.A., "TGn Sync Proposal Technical Specification," IEEE 802.11-04-0889r7, IEEE P802.11: Wireless LANs, Jul. 8, 2005, pp. 1-133, United States.

Kim, S. et al., "QoS Enhancement Scheme of EDCF in IEEE 802.11e Wireless LANs," Electronics Letters, vol. 40, No. 17, IEEE, Aug. 19, 2004, pp. 1091-1092, United States.

IEEE 802.11—2007, "IEEE Standard for Information Technology—Telecommunications and Information Exchange Between Systems—Local and Metropolitan Area Networks—Specific requirements: Part 11: Wireless LAN Medium Access Control (MAC) and Physical Layer (PHY) Specifications," 2007 Revision of IEEE Std 802.11-1999, IEEE Computer Society, Jun. 12, 2007, pp. i-1184, United States.

International Search Report dated Jan. 9, 2009 for International Application No. PCT/KR2008/004793 from Korean Intellectual Property Office, filed Aug. 19, 2008, pp. 1-2, Seo-gu, Daejeon, Republic of Korea.

Harada, H., "Unified and Flexible Millimeter Wave WPAN Systems Supported by Common Mode," IEEE P802.15 Working Group for Wireless Personal Area Networks (WPANs), IEEE 802.15-07-0761-10-003c, Sep. 18, 2007, Slides 1-62, United States.

Mirkovic, J. et al., "A MAC Protocol With Multi-User MIMO Support for Ad-Hoc WLANs", The 18th Annual IEEE International Symposium on Personal, Indoor and Mobile Radio Communications (PIMRC'07), IEEE, 2007, pp. 1-5, United States.

Stacey, R. et al., "DL MU-MIMO Ack Protocol (IEEE 802.11-09/1172r0)", IEEE, Nov. 16, 2009, pp. 1-8, United States.

IEEE Computer Society, "IEEE Std 802®-2001 (R2007), IEEE Standard for Local and Metropolitan Area Networks: Overview and Architecture", IEEE, Feb. 7, 2002, pp. i-36, New York, United States.

Camp, J.D. et al., "The IEEE 802.11s Extended Service Set Mesh Networking Standard", IEEE Communications Magazine, vol. 46, No. 8, IEEE, Aug. 2008, pp. 1-6, United States.

Morioka, Y. et al., "Multi-RTS Proposal", IEEE 802.11-10/1124r01, Sep. 12, 2010, Slides 1-14, IEEE, USA.

U.S. Non-Final Office Action mailed Oct. 26, 2011 for U.S. Appl. No. 12/455,438.

U.S. Final Office Action mailed Apr. 12, 2012 for U.S. Appl. No. 12/455,438.

U.S. Non-Final Office Action mailed Jul. 11, 2013 for U.S. Appl. No. 12/455,438.

U.S. Notice of Allowance mailed Oct. 21, 2013 for U.S. Appl. No. 12/455,438.

U.S. Non-Final Office Action mailed Jun. 6, 2012 for U.S. Appl. No. 12/415,981.

U.S. Final Office Action mailed Dec. 19, 2012 for U.S. Appl. No. 12/415,981.

(56) References Cited

OTHER PUBLICATIONS

U.S. Advisory Action mailed Mar. 8, 2013 for U.S. Appl. No. 12/415,981.
U.S. Non-Final Office Action mailed Aug. 8, 2013 for U.S. Appl. No. 12/415,981.
U.S. Final Office Action mailed Jan. 14, 2014 for U.S. Appl. No. 12/415,981.
U.S. Notice of Allowance mailed Apr. 10, 2014 for U.S. Appl. No. 12/415,981.
U.S. Non-Final Office Action mailed Jun. 9, 2009 for U.S. Appl. No. 11/589,519.
U.S. Final Office Action mailed May 12, 2010 for U.S. Appl. No. 11/589,519.
U.S. Notice of Allowance mailed Jan. 24, 2011 for U.S. Appl. No. 11/589,519.
U.S. Non-Final Office Action mailed Jun. 27, 2006 for U.S. Appl. No. 11/044,600.
U.S. Non-Final Office Action mailed Aug. 21, 2007 for U.S. Appl. No. 11/044,600.
U.S. Final Office Action mailed Jan. 15, 2008 for U.S. Appl. No. 11/044,600.
U.S. Non-Final Office Action mailed Aug. 7, 2008 for U.S. Appl. No. 11/044,600.
U.S. Non-Final Office Action mailed Jan. 25, 2007 for U.S. Appl. No. 11/044,600.
U.S. Advisory Action mailed May 15, 2008 for U.S. Appl. No. 11/044,600.
U.S. Restriction Requirement for U.S. Appl. No. 13/030,070 mailed Nov. 5, 2013.
U.S. Non-Final Office Action for U.S. Appl. No. 13/030,070 mailed May 15, 2014.
U.S. Non-Final Office Action for U.S. Appl. No. 13/177,386 mailed Dec. 17, 2013.
U.S. Non-Final Office Action for U.S. Appl. No. 12/821,940 mailed May 29, 2012.
U.S. Final Office Action for U.S. Appl. No. 12/821,940 mailed Aug. 21, 2012.
U.S. Non-Final Office Action for U.S. Appl. No. 12/821,940 mailed Jun. 24, 2014.
U.S. Notice of Allowance for U.S. Appl. No. 12/821,940 mailed Oct. 31, 2014.
U.S. Supplemental Notice of Allowability for U.S. Appl. No. 12/821,940 mailed Dec. 8, 2014.
U.S. Supplemental Notice of Allowability for U.S. Appl. No. 12/821,940 mailed Dec. 19, 2014.
U.S. Restriction Requirement for U.S. Appl. No. 13/253,926 mailed Oct. 10, 2013.
U.S. Non-Final Office Action for U.S. Appl. No. 13/253,926 mailed Nov. 25, 2013.
U.S. Final Office Action for U.S. Appl. No. 13/253,926 mailed Apr. 29, 2014.
U.S. Advisory Action for U.S. Appl. No. 13/253,926 mailed Jul. 11, 2014.
U.S. Notice of Allowance for U.S. Appl. No. 13/253,926 mailed Aug. 15, 2014.
U.S. Supplemental Notice of Allowability for U.S. Appl. No. 13/253,926 mailed Oct. 15, 2014.
U.S. Supplemental Notice of Allowability for U.S. Appl. No. 13/253,926 mailed Nov. 26, 2014.
U.S. Non-Final Office Action for U.S. Appl. No. 14/023,204 mailed Mar. 11, 2015.
U.S. Non-Final Office Action for U.S. Appl. No. 14/023,195 mailed Aug. 14, 2015.
U.S. Final Office Action for U.S. Appl. No. 14/023,204 mailed Jul. 23, 2015.
U.S. Notice of Allowance for U.S. Appl. No. 14/023,204 mailed Oct. 16, 2015.

\* cited by examiner

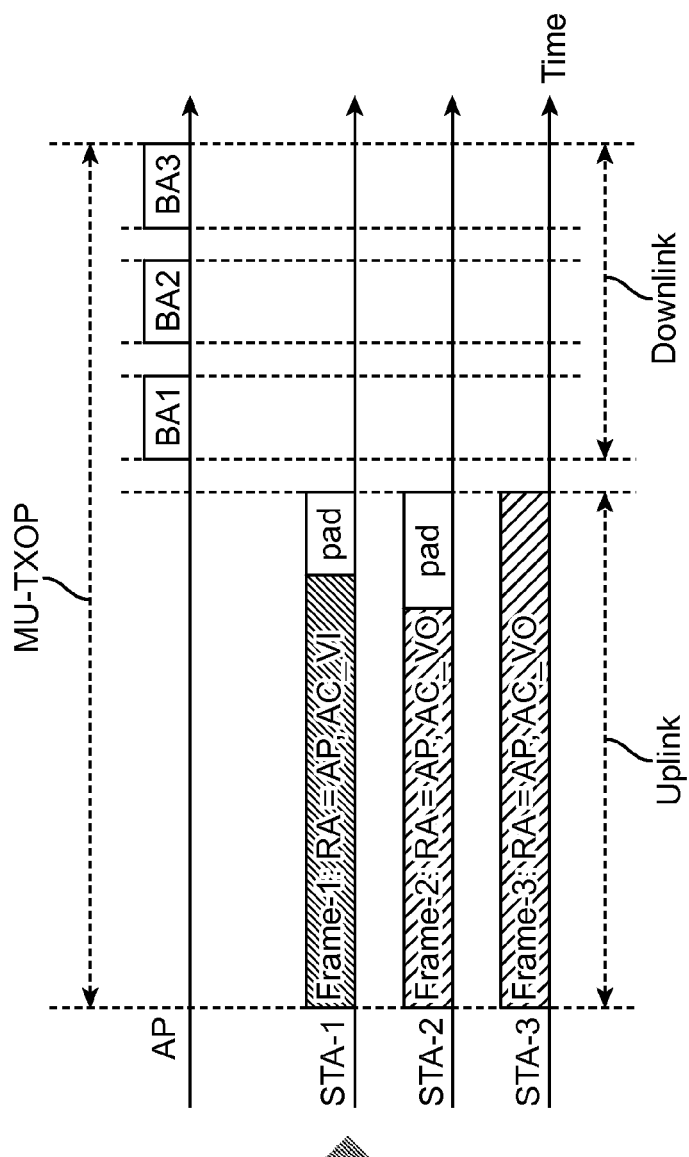
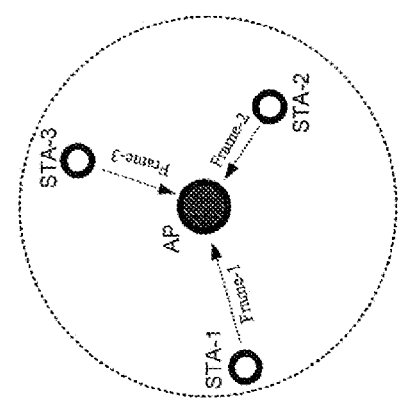
FIG. 1B
FIG. 1A

| Bits | Field | Description |
| --- | --- | --- |
| B0-B6 | Scrambler Initialization | Set to the scrambler initialization bits in the TXVECTOR parameter SERVICE |
| B7 | Reserved | Set to the reserved bit in the TXVECTOR parameter SERVICE |
| B8-B15 | CRC | CRC calculated over VHT-SIG-B (excluding tail bits) |

FIG. 6

| Frame Control | Duration/ID | Address 1 | Carried Frame Control | HT Control | Carried Frame | FCS |
|---|---|---|---|---|---|---|
| 2 | 2 | 6 | 2 | 4 | variable | 4 |

Octets:

42

METHOD AND SYSTEM FOR UPLINK MULTI-USER MULTIPLE-INPUT-MULTIPLE-OUTPUT COMMUNICATION IN WIRELESS NETWORKS

FIELD OF THE INVENTION

The present invention relates generally to wireless networks, and in particular, to uplink multi-user multiple-input-multiple-output communication in wireless networks.

BACKGROUND OF THE INVENTION

In a typical wireless network utilizing a coordination function for coordinating transmissions among wireless stations, such a function may be implemented in one of the wireless stations or a coordinator device such as an access point (AP). The wireless stations may communicate via directional transmissions using sector antennas and beamforming antenna arrays. The coordinator device may use omnidirectional transmissions for broadcasts to all wireless stations in all directions (e.g., 360 degrees range). Alternatively, the coordinator may use quasi-omnidirectional transmissions for broadcasts to a wide range, but not necessarily in all directions. In many wireless area networks (WLANs) such as those according to IEEE 802.11 standards, a coordinator station in infrastructure mode is used for providing contention-free access to a wireless communication medium to support Quality of Service (QoS) for certain applications.

In the absence of a coordinator, to provide contention-free channel time reservation, existing techniques use announcement or information exchange among wireless stations in a network to negotiate/reserve the use of the communication medium. For example, IEEE 802.11e Enhanced Distributed Channel Access (EDCA) provides QoS support for certain applications using announcement or information exchange. EDCA defines four Access Categories (ACs) and introduces service differentiation such that certain data traffic uses higher priority parameters to contend for the communication medium.

Further, a frame structure is used for data transmission between wireless stations such as a transmitter station and a receiver station. In one example, a frame structure in a Media Access Control (MAC) layer and a physical (PHY) layer is utilized, wherein in a transmitter station, a MAC layer receives a MAC Service Data Unit (MSDU) and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. The PHY layer includes transmission hardware for transmitting data bits over a wireless link. Before transmission as a frame from the transmitter station to the receiver station, a preamble is attached to the PPDU, wherein the preamble can include channel estimation and synchronization information.

EDCA allows contention for transmission opportunities (TXOPs), wherein a TXOP is a time interval when a quality of service (QoS) wireless station (STA) may initiate frame transfer on the wireless medium (e.g., wireless channel). The TXOP may be assigned to the wireless station by a coordinator, or the wireless station may obtain the TXOP by successfully contending for the wireless channel.

BRIEF SUMMARY OF THE INVENTION

The present invention provides a method and system for wireless communication in a wireless network. A wireless station obtains a transmission opportunity period (TXOP) for communicating with an access point (AP) over a wireless communication channel. The wireless station sends an announcement to the AP to share the transmission opportunity period with at least another wireless station, as a multi-user transmission opportunity period for simultaneously transmitting data from said wireless stations to the AP on multiple uplink (UL) spatial streams over the wireless channel.

These and other features, aspects and advantages of the present invention will become understood with reference to the following description, appended claims and accompanying figures.

BRIEF DESCRIPTION OF THE DRAWINGS

FIG. 1A shows a diagram of a wireless system implementing multi-user transmit opportunity (MU-TXOP) for wireless uplink multi-user multiple-input-multiple-output (UL MU-MIMO) communication, according to an embodiment of the present invention.

FIG. 1B shows a process for UL MU-MIMO communication in FIG. 1A, according to an embodiment of the present invention.

FIG. 6 shows the reserved bits of the enhanced RTS frame for UL MU-MIMO communication, according to an embodiment of the present invention.

DETAILED DESCRIPTION OF THE INVENTION

Figure 2A:
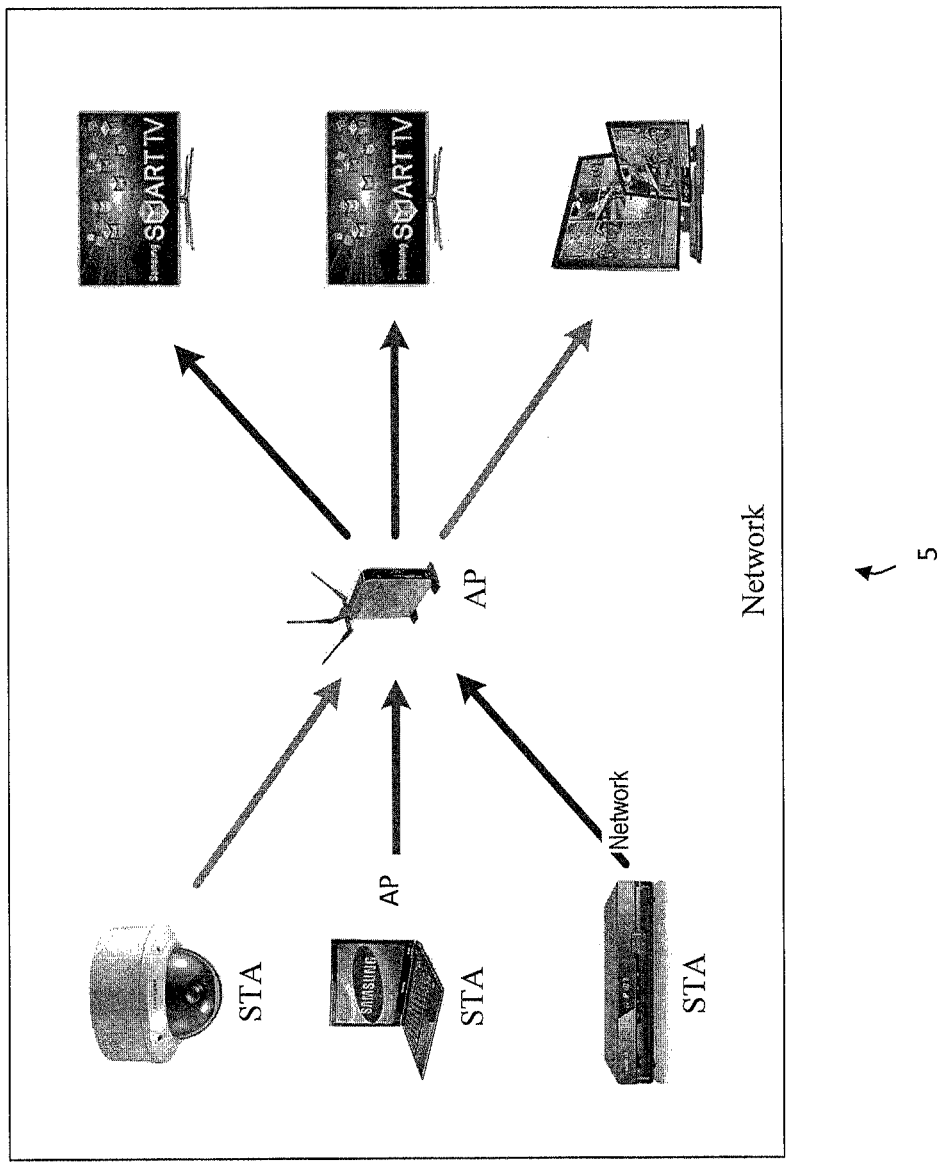
FIG. 2A shows an example wireless network implementing UL MU-MIMO communication, according to an embodiment of the present invention.

Embodiments of the present invention provide a method and system for uplink (UL) multi-user multiple-input-multiple-output (MU-MIMO) communication in wireless networks. Embodiments of the present invention allow simultaneously transmitting multiple uplink spatial streams from multiple wireless stations to an access point (AP) during a multi-user transmit opportunity over a wireless medium, such as a shared wireless radio frequency (RF) channel. Embodiments of the present invention are further useful with simultaneously transmitting multiple downlink spatial streams to multiple wireless stations from the AP during a multi-user transmit opportunity over a wireless medium. Embodiments of the invention employ a multi-user transmit opportunity (MU-TXOP) mechanism for a wireless network to support multiple traffic streams for multiple wireless stations simultaneously.

In one embodiment, the present invention provides wireless channel access protocols and a mechanism to establish the UL MU-MIMO transmission. The channel access protocols extend the existing WLAN (IEEE 802.11) standard to support uplink MU-MIMO transmission (i.e., multiple stations sending data frames to an access point).

In one embodiment, the present invention provides a MAC protocol for enabling UL MU-MIMO transmissions. According to an embodiment of the invention, a new frame subtype is provided for IEEE 802.11 standard for QoS CF-Multi-Poll. According to an embodiment of the invention, enhanced RTS/CTS frame exchanges are provided for initiating UL MU-MIMO transmissions. According to an embodiment of the invention, an ultra-high throughput (UHT) control wrapper frame with RTS/CTS frames is provided for initiating UL MU-MIMO transmissions. According to an embodiment of the invention, uplink transmission request (UTR) and uplink transmission indication (UTI) frames are provided for initiating UL MU-MIMO transmissions.

Uplink multi-user MIMO (UL MU-MIMO) protocol allows multiple traffic streams to be transmitted from different wireless stations (STAs) to a single access point (AP) simultaneously via multiple spatial streams, through the use of smart antennas and beamforming technology. Embodiments of the invention provide reduced overhead, backward compatibility, and save on reserved frame subtypes.

FIG. 1A illustrates an example in which three non-AP STAs transmit to one AP STA simultaneously. Specifically, FIG. 1A illustrates an uplink transmission involving multi-user MIMO transmission of frames Frame-1, Frame-2, Frame-3 from wireless stations STA-1, STA-2, STA-3 to an AP station during a MU-TXOP, respectively, via multi-path directional transmissions, according to an embodiment of the invention.

FIG. 1B shows a timing diagram for the example communication in FIG. 1A, wherein during a MU-TXOP, in an uplink (UL) phase, wireless stations STA-1, STA-2, STA-3 simultaneously and directionally transmit the three frames Frame-1, Frame-2, Frame-3 to the AP station respectively. Each of the frames Frame-1, Frame-2, Frame-3 includes a receiver address (RA) set to the AP station address. In a downlink phase, the AP station sends a block acknowledgement (BA) to each of the wireless stations STA-1, STA-2, STA-3 (i.e., BA1, BA2, BA3).

All three stations, STA-1 to STA-3, transmit at the same time to the AP through different spatial streams. Control and management frame exchanges are omitted for ease of illustration. The sequential acknowledgement scheme from the AP station shown in FIG. 1B is only one example of different acknowledgement scheme options.

FIG. 2A shows an example application of uplink MU-MIMO communication in a WLAN network 5, according to an embodiment of the invention. The network includes an AP station and several small-form-factor devices (i.e., STAs) that can only support 1-2 spatial streams. Such devices include, but not limited to, smartphones, netbooks, tablets, cameras, camcorders, multimedia players, video surveillance cameras, etc. Example applications of uplink MU-MIMO cover home network, enterprise, and hotspot scenarios.

As used herein, the term "UHT-capable device/STA" means a device/STA capable of performing uplink MU-MIMO communication functions. Enabling UL MU-MIMO transmission includes time synchronization, frequency synchronization, power control, enhanced AP capability, and enhanced MAC protocol. Embodiments of the invention focus on a MAC protocol enhancement, which enhance existing IEEE 802.11 MAC protocol, in order to support UL MU-MIMO transmissions. Embodiments of the invention address how a STA informs the AP that the STA has obtained a TXOP and it is willing to share it with other STAs for UL transmission. Embodiments of the invention address how the AP polls desired STAs that have buffered data frames to transmit at the same time.

According to embodiments of the invention, a protocol for enabling UL MU-MIMO transmissions operate in the EDCA mode. Under EDCA operation rules, each STA contends for channel access using a distributed algorithm (i.e., CSMA/CA and a serial of channel access rules). The EDCA operation rules remain the same for UL MU-MIMO as in the current IEEE 802.11 standards, and therefore not detailed further herein.

Initiation Process for UL MU-MIMO Transmission

Figure 2B:
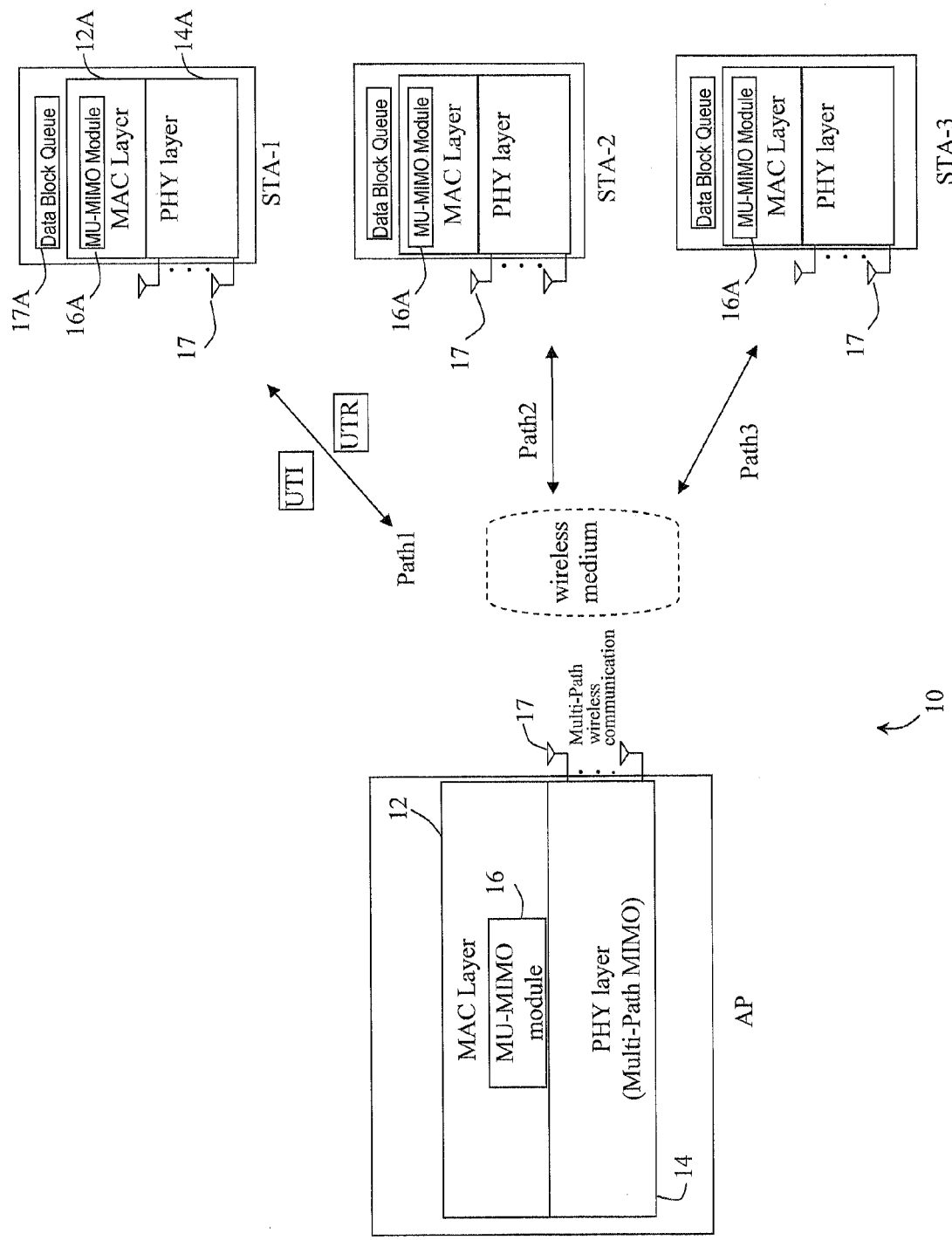
FIG. 2B shows a block diagram of a wireless network UL MU-MIMO communication, according to an embodiment of the present invention.

FIG. 2B shows a wireless network 10, according to an embodiment of the invention. The wireless network comprises a wireless local area network (WLAN) comprising multiple wireless devices including STA-1, STA-2, STA-3 and AP. The AP manages simultaneous transmissions from multiple wireless stations to the access point on multiple uplink (UL) spatial streams during a multi-user transmission opportunity period over a wireless channel. The AP includes a MAC layer 12 and a PHY layer 14, wherein the MAC layer 12 includes a channel access module implemented as a MU-MIMO module 16 that provides EDCA MU-MIMO communication including UL MU-MIMO, according to an embodiment of the invention. Each of the wireless devices STA-1, STA-2, STA-3 includes a MAC layer 12A and a PHY layer 14A. Each STA MAC layer 12A includes a channel access module implemented as MU-MIMO module 16A that provides UL MU-MIMO, according to an embodiment of the invention.

Figure 2C:
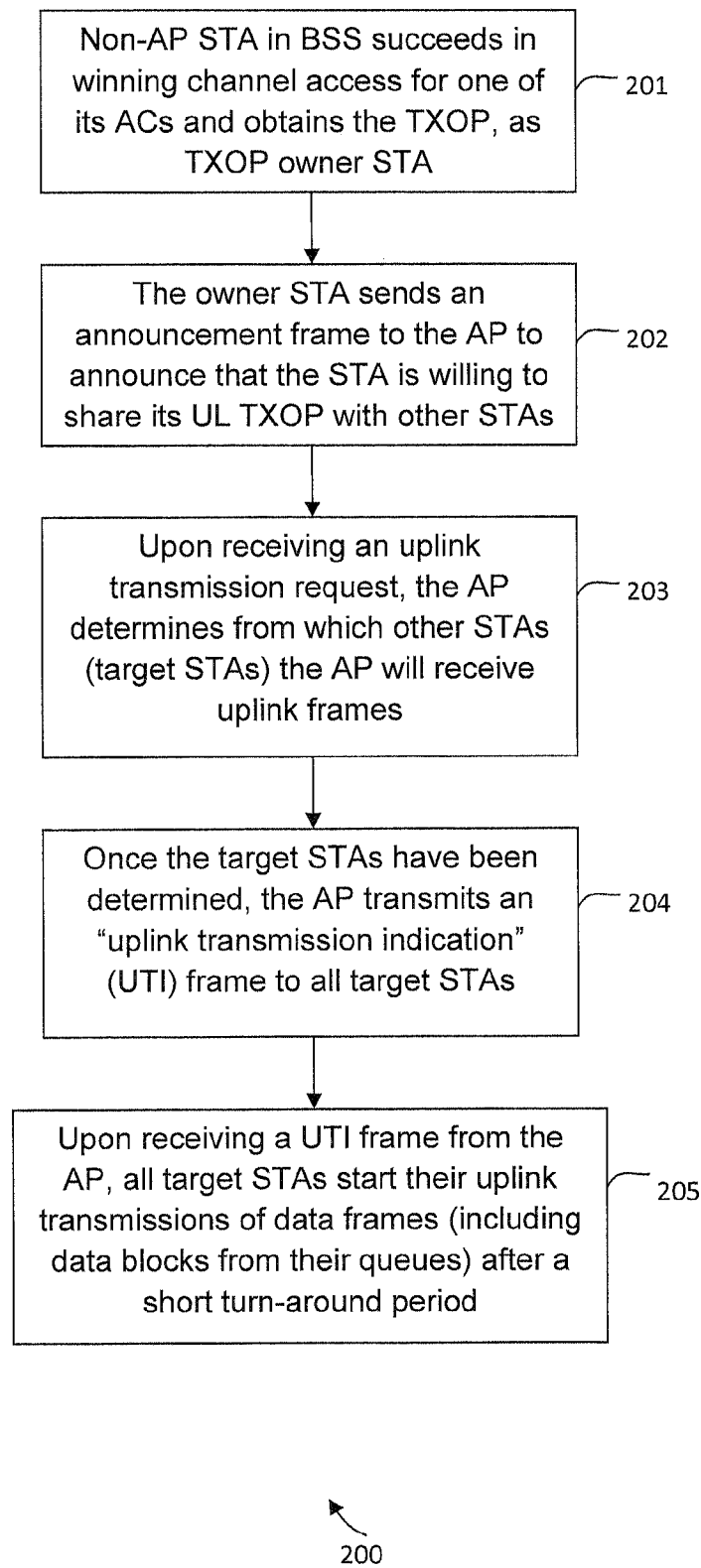
FIG. 2C shows an example uplink MU-MIMO process, according to an embodiment of the invention.

FIG. 2C shows an example uplink MU-MIMO process 200, according to an embodiment of the invention. The process 200 comprises process blocks described below. Process block 201: An initiation process includes a frame exchange process before any user data can be transferred in UL MU-MIMO communication. An initiation of the MU-TXOP occurs when the EDCA rules permit access to the medium. An initiation process begins with one of the non-AP STAs in a Basic Service Set (BSS) succeeding in winning channel access for one of its ACs and obtains the TXOP. This STA becomes the TXOP owner STA.

Process block 202: The owner STA sends an announcement frame to the AP to announce that the STA is willing to share its UL TXOP with other STAs. Because the STA is the owner of the TXOP, it need not request the right for transmission since the STA has the right to transmit already. The purpose of the announcement is to inform the AP that the STA it is willing to share the UL TXOP with other STAs. Along with the announcement frame, additional information including the following is provided to the AP: (1) The requested TXOP duration and (2) The AC of the winning EDCAF (this information provides the AP the maximum TXOP duration that can be granted to the TXOP owner). The announcement frame can also be treated as the TXOP owner's request to the AP to start a UL MU-MIMO transmission. Accordingly, the announcement frame is called an "uplink transmission request" (UTR) herein.

Process block 203: Upon receiving the uplink transmission request, the AP determines from which other STAs (i.e., target STA) the AP will receive uplink frames. The determination can be made based on each STA's request of TXOP duration and their queue size. The queue's size indicates the number of frames in transmission queue 17A (FIG. 2B) of data blocks each STA. This information is delivered to the AP via QoS control field carried in uplink QoS data frames sent earlier.

Process block 204: Once the targeted STAs have been determined, the AP transmits an "uplink transmission indication" (UTI) frame to all targeted STAs with the following information: (1) A list of addresses of STAs that are allowed to transmit in the uplink phase during the MU-TXOP uplink phase and (2) the allowed uplink transmission time for each target STA.

Process block 205: Upon receiving a UTI frame from the AP, all target STAs in the address list start their uplink transmissions of data frames (including data blocks from their queues) immediately after a short turn-around period, such as Short Interframe Space (SIFS) period. The SIFS period is to ensure the STA uplink transmissions to the AP during the uplink phase of the MU-TXOP are synchronized in time so that the AP can correctly decode the data carried in the uplink data frames belonging to each target STA.

In the example shown in FIG. 2B, there are buffered data in the Data Block Queue 17A in all three stations STA-1, STA-2, and STA-3. During an UL MU-TXOP multiple traffic streams belonging to the same or different access categories from multiple wireless stations STA-1, STA-2, and STA-3 are transmitted simultaneously over a wireless medium over multiple wireless paths Path1, Path2, Path3. The AP and all three stations implement MU-MIMO over multiple antennas 17 (FIG. 2B).

A primary aspect of the general initiation process described above comprises exchange of the UTR and UTI frames. In a preferred embodiment, a UTR/UTI frame exchange protocol includes considerations of the following factors:

Transmission reliability—the AP needs to receive the UTR frame reliably and all STAs need to receive the UTI frame reliably.

Backward compatibility—legacy STAs do not need to act on the UTR/UTI frames but they need to be able to set their NAV values correctly.

Control overhead—UTR/UTI frames are transmitted at the basic-MCS data rates to reduce overhead.

Accordingly, a first example implementation of the above initiation process according to the invention includes using an enhanced RTS as the UTR and an enhanced CTS as the UTI. A second example implementation includes using RTS/CTS frames with a UHT Control Wrapper as UTR/UTI frames. A third example implementation includes using a pair of newly created control frames, UTR/UTI. As used herein, the acronyms UTR and UTI also refer to the functions of certain frames (e.g., in the first and second examples) and also refer to concrete frame formats (e.g. in the third example).

Figure 3:
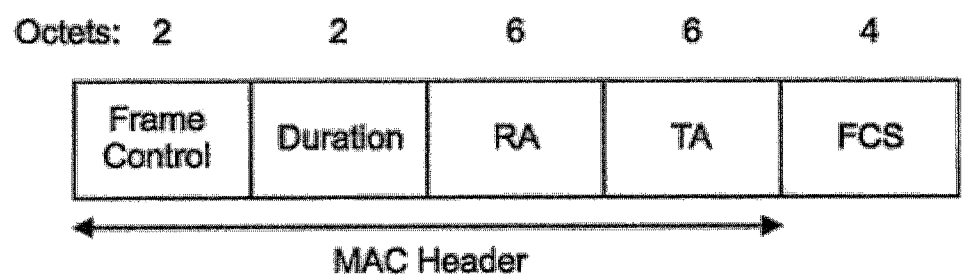
FIG. 3 shows an enhanced Request to Send (RTS) frame for UL MU-MIMO communication, according to an embodiment of the present invention.
Figure 4:
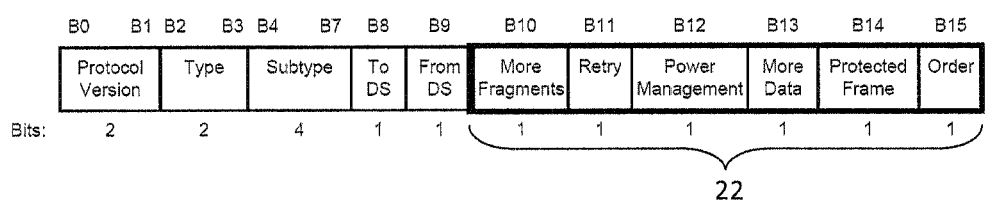
FIG. 4 shows a Frame Control field of the enhanced RTS frame for UL MU-MIMO communication, according to an embodiment of the present invention.

Initiation Process for UL MU-MIMO Transmission Using enhanced RTS/CTS with Special Indication as UTR/UTI According to a first example initiation process for UL MU-MIMO transmission of an embodiment of the invention, an enhanced RTS frame 20 as shown in FIG. 3 is used by the TXOP owner STA to inform the AP that it is willing to share the TXOP with other non-AP STAs for uplink transmission, serving as a UTR frame. The Frame Control field is modified as shown in FIG. 4, according to an embodiment of the invention. The requested TXOP duration is included in the Duration field of the RTS frame 20, along with other durations of control overhead (e.g., the transmission time of CTS, the SIFS inter-frame spacing time, and so on). To use said RTS frame as the UTR frame, the AP must be able to distinguish between the enhanced RTS 20 from a conventional (legacy) RTS frame so that the proper RTS processing is invoked at the AP.

Because the enhanced RTS and a legacy RTS share the same frame type and sub-type, in one embodiment the invention provides a mechanism to distinguish between them. The enhanced RTS and a legacy RTS have the same frame format as shown in FIG. 3, however as described in relation to FIGS. 4-8 hereinbelow, an enhanced RTS is differentiated from a legacy RTS, according to embodiments of the invention.

The following three example approaches can be used to distinguish the enhanced RTS frame 20 from a legacy RTS frame, according to embodiment of the invention: (1) Using one of the bits in the Frame Control field of the MAC header of the enhanced RTS frame (i.e., overloading by reusing a bit that does not carry any useful information for a RTS frame), (2) Using one of the reserved bits in the Service field of the enhanced RTS frame, and (3) Using one of the available bits in the preamble of the enhanced RTS frame.

Approach #1: Using a Sub-Field in the Frame Control Field of the MAC Header of the RTS Frame One bit in the MAC header is used to indicate the difference between a legacy RTS frame and an enhanced RTS frame serving as a UTR frame according to an embodiment of the invention. This is accomplished by overloading one of the bits in the Frame Control field of the enhanced RTS frame as shown in FIG. 4, which illustrates details of the Frame Control Field 21 of the MAC Header of the enhanced RTS frame according to an embodiment of the invention.

In a legacy RTS frame, many sub-fields in the Frame Control field are irrelevant to RTS. These sub-fields include all fields in the block 22 (6 bits/fields in total) in FIG. 4. The values of these sub-fields are normally not checked when a RTS frame is received by the AP. Therefore, using any of these sub-fields to indicate the UTR function of an enhanced RTS frame will not cause any confusion at the AP. The AP is configured to check the value of specific bit when an RTS frame is received. Non-UHT-capable STAs will interpret this RTS as a legacy RTS and sets their NAV values correctly. All sub-fields in block 22 can be used to indicate an enhanced RTS frame (i.e., a multi-user RTS frame), and according to an embodiment of the invention, one of the least confusing sub-fields, such as "More Fragments", is overloaded to indicate a UTR function because a RTS frame is never to be fragmented.

When the "More Fragments" sub-field is selected to indicate the UTR function, this sub-field becomes a "UTR" sub-field in a BSS where UL MU-MIMO is in operation. When an RTS is sent from a STA, an UL MU-MIMO-capable AP checks the value of the UTR sub-field. When the value of the "More Fragments" sub-field of the RTS frame is set to 1 by the TXOP owner STA, the RTS frame is interpreted by the AP as a request to the AP to allow an UL MU-MIMO communication for the duration indicated in the "Duration" field of the enhanced RTS frame 20. When the value of said sub-field is set to 0 by the TXOP owner STA, the RTS frame 20 is interpreted as a conventional RTS (i.e., no UL MU-MIMO transmission is requested from the TXOP owner STA).

Figure 5:
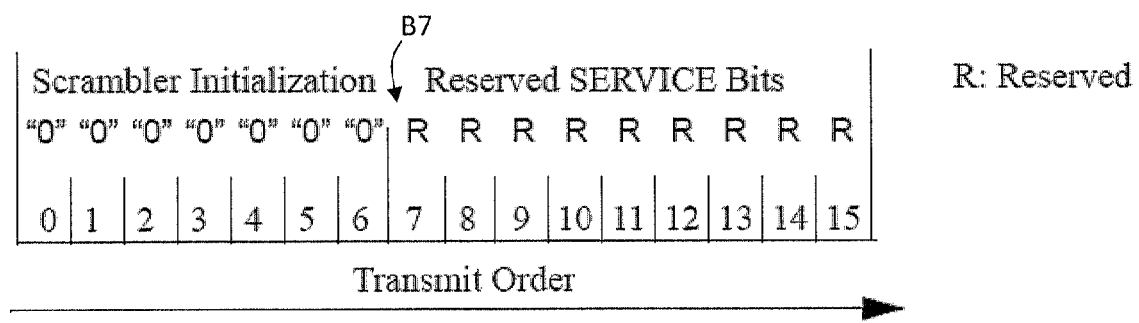
FIG. 5 shows the Service field of the enhanced RTS frame for UL MU-MIMO communication, according to an embodiment of the present invention.

Approach #2: Using One of the Reserved Bits in the Service Field of the RTS Frame According to an embodiment of the invention, in this approach, one of the reserved bits in the Service field of the RTS frame 20 is used (which is common to all IEEE 802.11a, IEEE 802.11n, and IEEE 802.11ac frames), to indicate to the AP that an RTS frame is a UTR frame. FIG. 5 shows the reserved bits that are available for IEEE 802.11a/n devices. FIG. 6 shows the reserved bits that are available for IEEE 802.11ac devices. The Bit 7 (B7) subfield in both formats in FIGS. 5-6 is available and is used as an indication for a UTR frame, according to an embodiment of the invention. The B7 value is set to "1" in the RTS frame to indicate that the RTS frame is not a legacy RTS frame, but an enhanced RTS frame for the UTR function.

Approach #3: Using One of the Available Bits in the Preamble of the RTS Frame

According to an embodiment of the invention, in this approach, one of the fields (bits) in various fields of the preamble of the RTS frame is used to indicate UTR function. These fields include different Signal fields in the RTS frame preambles of different versions of IEEE 802.11 standards.

Figure 7:
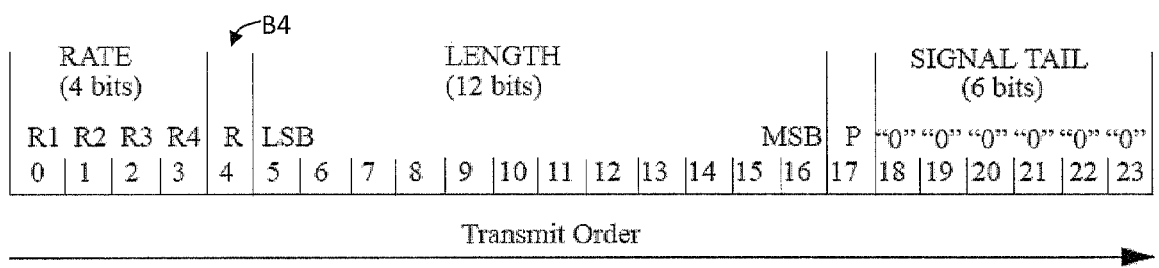
FIG. 7 shows the Signal field of the enhanced RTS frame for UL MU-MIMO communication, showing available bits.
Figure 8:
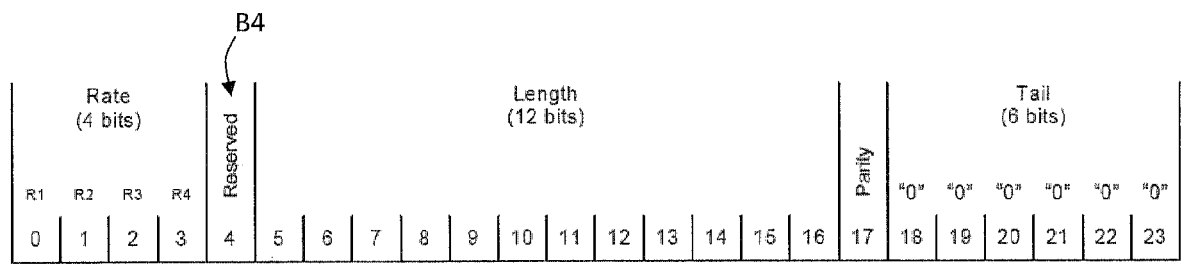
FIG. 8 shows frame structure of the L-SIG Field of the enhanced RTS frame for UL MU-MIMO communication.

FIG. 7 shows IEEE 802.11a Signal field of an RTS frame. In IEEE 802.11 HT (High Throughput, i.e. IEEE 802.11n) and IEEE 802.11 VHT (Very High Throughput, i.e., IEEE 802.11ac) standards, the Signal field in IEEE 802.11a was renamed as L-SIG, to indicate that it is a legacy Signal field. FIG. 8 shows frame structure of the L-SIG Field of IEEE 802.11n and IEEE 802.11ac Standard.

In both formats in FIGS. 7-8, Bit 4 (B4) is available to be used as an indication of UTR frame, according to an embodiment of the invention. The value of B7 is set to "1" in an RTS frame sent by the TXOP owner to indicate to the AP that it is an enhanced RTS frame with the UTR function. Other than the Signal fields discussed above, another field for the IEEE 802.11 standard can also be used to carry the indication of the UTR function of the RTS frame, according to embodiments of the invention.

Accordingly, the aforementioned three approaches can be used to differentiate an enhanced RTS from a conventional RTS frame to indicate that the enhanced RTS is a request by a TXOP owner STA to the AP for UL MU-MIMO transmission during a MU-TXOP. The AP also is informed of which Access Category (AC) in the TXOP owner STA has won the channel access. This is used to determine the maximum duration the TXOP can be. This function is optional since STAs regulate themselves by default to follow the TXOP maximum duration rules (the STAs do not request more than they are allowed). In case the AC information is needed, any two bits in the block 22 of the Frame Control field in FIG. 4 (e.g., the Retry bit and the Power Management bit) can be used. Table 1 below defines the bit values and their values.

TABLE 1

Bit Values and the Access Categories

| $b_1 b_2$ | AC | Description |
| --- | --- | --- |
| 00 | AC_BE | Best Effort |
| 01 | AC_BK | Background |
| 10 | AC_VI | Video |
| 11 | AC_VO | Voice |

Figure 9:
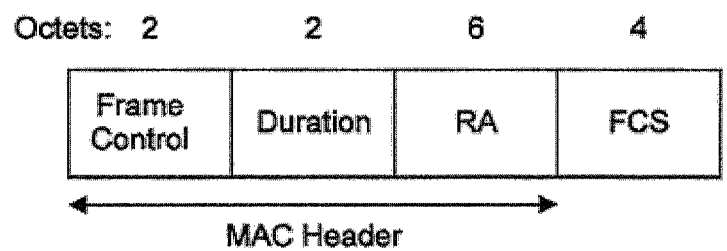
FIG. 9 shows enhanced Clear to Send (CTS) frame for UL MU-MIMO communication.

According to the above implementation, the UTR function is achieved by using an enhanced RTS frame, according to embodiment of the invention. Once the AP has successfully decoded the information carried by the enhanced RTS frame, the AP determines the targeted STAs to be included in the UTI indication frame. Using the RTS as the UTR frame implies the immediate reply frame from the AP should be a CTS frame. This is to keep the conventional RTS/CTS frame exchange sequence to reduce any need for hardware design changes. The duration field of the enhanced CTS frame 25, as shown in FIG. 9, carries the granted TXOP duration together with other control overheads.

To poll multiple STAs for uplink transmission, the CTS frame may include addresses of multiple targeted STAs. However, a legacy CTS frame has only one RA (Receiver Address) field and hence cannot carry multiple addresses. According to embodiments of the invention, said polling function can be achieved by three approaches: (1) Replacing the conventional RA field of the CTS frame with a compressed RA field to represent up to four STAs, (2) Sending a conventional CTS frame followed by a newly created CF-Multi-Poll frame, which contains the MAC addresses of STAs from which the AP is expected to received uplink data from, or (3) Sending the newly created CF-Multi-Poll frame only. These approaches are described in more detail below.

Figure 10:
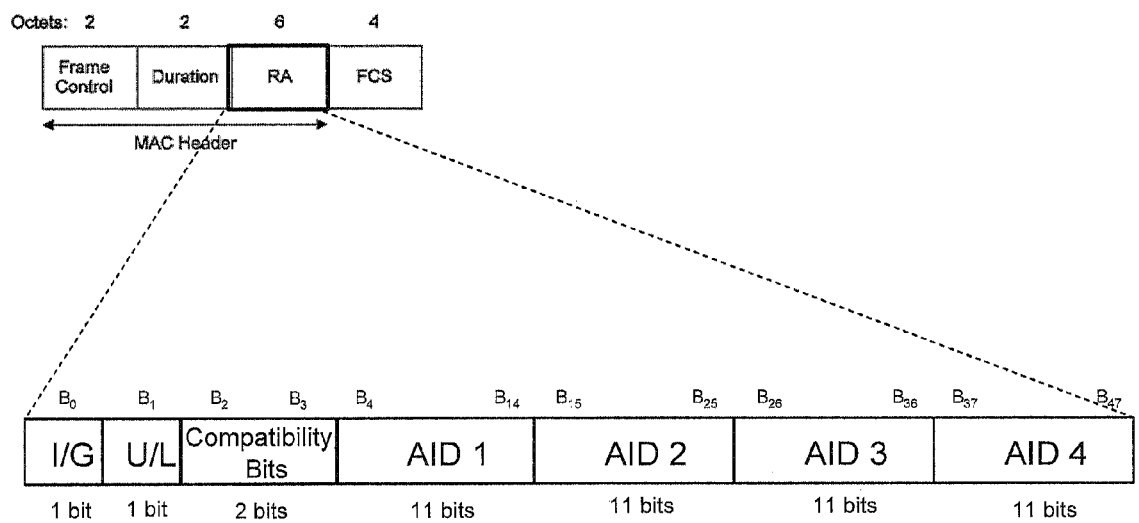
FIG. 10 shows the Compressed RA field structure, containing up to four Association IDs (AIDs) of an enhanced CTS frame for UL MU-MIMO communication, according to an embodiment of the present invention.

Approach #1: Using a Compressed RA Field of CTS Frame to Represent Up to Four Receiving STAs for UL Mu-Mimo Communication According to an embodiment of the invention, in this approach, the RA field in the CTS frame is used to represent up to four receivers STAs. The enhanced CTS frame 25 and the Compressed RA field structure therein are shown in FIG. 10. The I/G bit indicates whether this is an individual address or a group address. The U/L bit indicates whether this is a "universally administered address" or a "locally administered address". A universally administered address is uniquely assigned to a device by its manufacturer and it is globally unique. It is sometimes called a burned-in address. A locally administered address is assigned to a device by a network administrator, overriding the burned-in address. Locally administered addresses do not contain OUIs. The Compatibility Bits are 2 bits in length. The function of the Compatibility Bits is to distinguish this virtual MAC address from any real MAC addresses of the legacy devices (including both IEEE 802.11a, 802.11n, 802.11ac and other devices) present in the BSS.

Four receiver STAs are identified as AID1, AID2, AID3, and AID4. The AID (Association Identifier) fields contain the AIDs of the targeted STAs. An AID is a value assigned to a STA by the AP in the association response frame that established that STA's current association. Each AID is 11 bits in length and can be used to identify a unique STA in a BSS. Using this approach, the virtual Compressed RA cannot be the same as the MAC address of any legacy device. Otherwise a matching legacy device will treat this RA as its own MAC address and process the CTS frame. A Compressed RA can be the same as one or more UHT-capable devices since they will process the CTS frame further to determine whether it is a CTS with UTR function or a legacy CTS frame. The devices will use the AIDs in the Compressed RA field to determine whether they are the targeted STAs, not the face value of the RA.

In one embodiment, the following three methods are used to create a unique Compressed RA that is different from any regular MAC addresses of the legacy devices in the BSS. In a first step, always set the U/L Address bit (Bit1) to 1 to indicate a locally assigned address. A locally assigned address is only meaningful within a BSS. Because for every commercial product the U/L address bit will be set to indicate a "universally administered address", by using this method itself, the compressed RA is made different from most of the MAC addresses of the most legacy devices. In a second step, if the Compressed RA field still matches one or more of MAC addresses of the legacy devices in the BSS, an AP can change the value of the Compatibility Bits to make this Compressed RA a different address. There are four different values to select from. In a third step, if the Compressed RA field still matches one or more of MAC addresses of the legacy devices in the BSS, the AP can switch the order of the AIDs listed in the compressed RA field to make it a different value.

Figure 11:
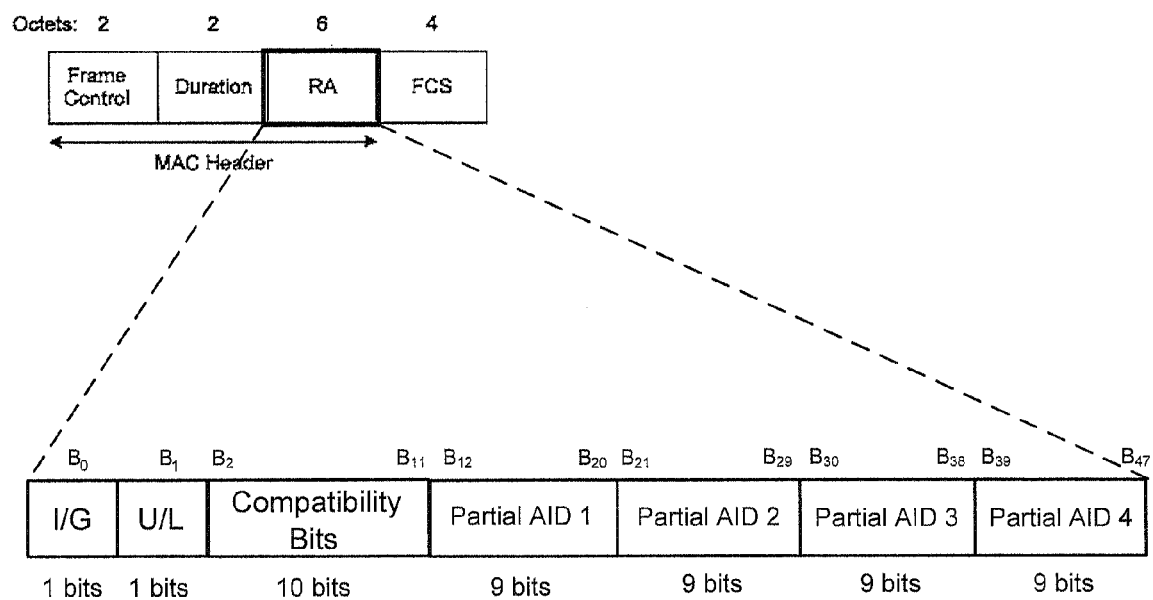
FIG. 11 shows the Compressed RA Field, containing up to four Partial AIDs of an enhanced CTS Frame for UL MU-MIMO communication, according to an embodiment of the present invention.

FIG. 11 illustrates an enhanced CTS Frame 26 with a Compressed RA Field. A Partial AID is used, which contains only the 9 LSBs (least significant bits) of an 11-bit AID, according to an embodiment of the invention. In this case, the Compatibility Bits can be as long as 10 bits (which represents 1024 different values), making it essentially a unique Compressed RA different from any regular MAC addresses of the legacy devices in a BSS.

Figure 12:
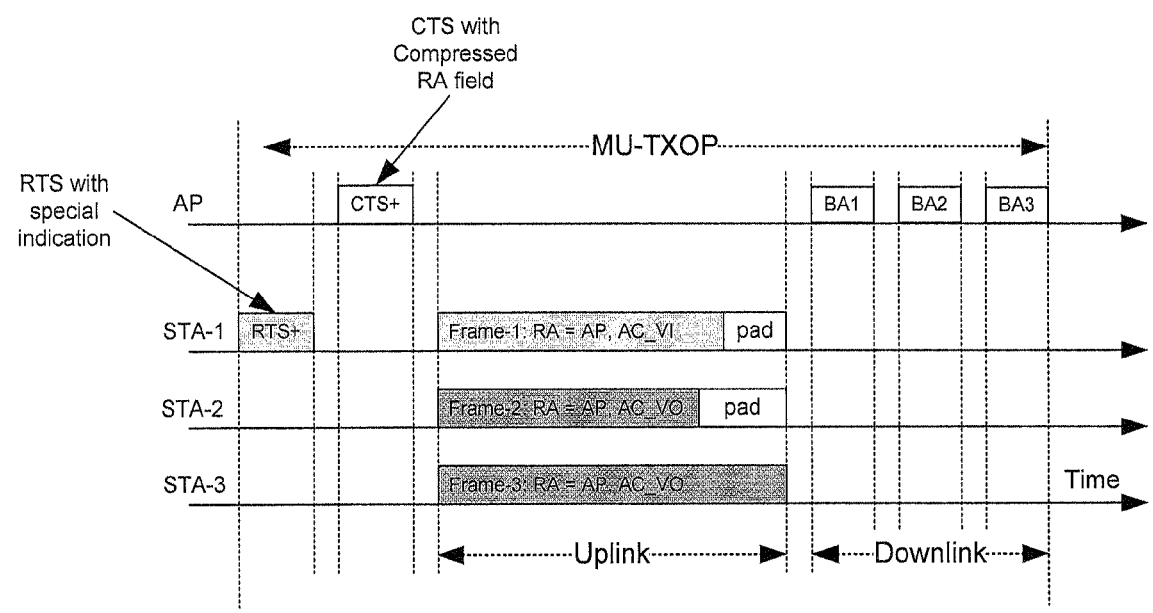
FIG. 12 shows an example frame exchange process for UL MU-MIMO communication, according to an embodiment of the present invention.

FIG. 12 shows an example frame exchange process 30 based on FIG. 1B, using enhanced RTS frame indicationas RTS+ (i.e., RTS with special indication), enhanced CTS frame indicates as CTS+ (i.e., CTS with Compress RA field) and Data frames, for UL MU-MIMO communication according to this embodiment of the invention.

Figure 13:
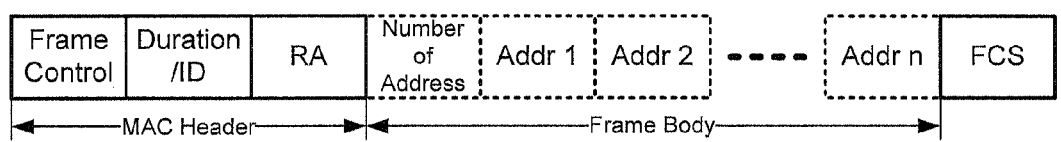
FIG. 13 shows a QoS CF-Multi-Poll frame for UL MU-MIMO communication, according to an embodiment of the present invention.

Approach #2: Using Conventional CTS Followed by a Newly Created QoS CF-Multi-Poll Frame for UL MU-MIMO Communication According to an embodiment of the invention, in this approach, a conventional (legacy or normal) CTS frame is first sent back from the AP to the UTR sender STA with the duration field set to the requested TXOP duration plus any control overheads. Because this conventional CTS does not contain the address list of the targeted STAs, another frame needs to be sent for this purpose according to an embodiment of the invention. In one implementation, a new QoS CF-Multi-Poll frame 32 is employed by the AP, wherein said frame has a Data frame subtype 1101 for polling all the targeted STAs for uplink transmission, as shown in FIG. 13.

In the frame 32, the Duration field reflects the requested TXOP plus any overhead (e.g., a SIFS). The RA field contains the MAC address of the UTR sender. The first field of the frame body, the Number of Address field, contains the number of additional receiver addresses (other than the UTR sender STA's address) carried in the frame body. For example, if the value of the Number of Address field equals to 4, then the frame body will contain 4 additional receiver addresses (n=4). The frame 32 may contain other fields in the MAC Header, such as QoS Control and HT/UHT Control fields. Although frame 32 is a data frame, it is transmitted at one of the rates in the BSSBasicRateSet parameter in order to set the NAV of all STAs that are not being polled.

Figure 14:
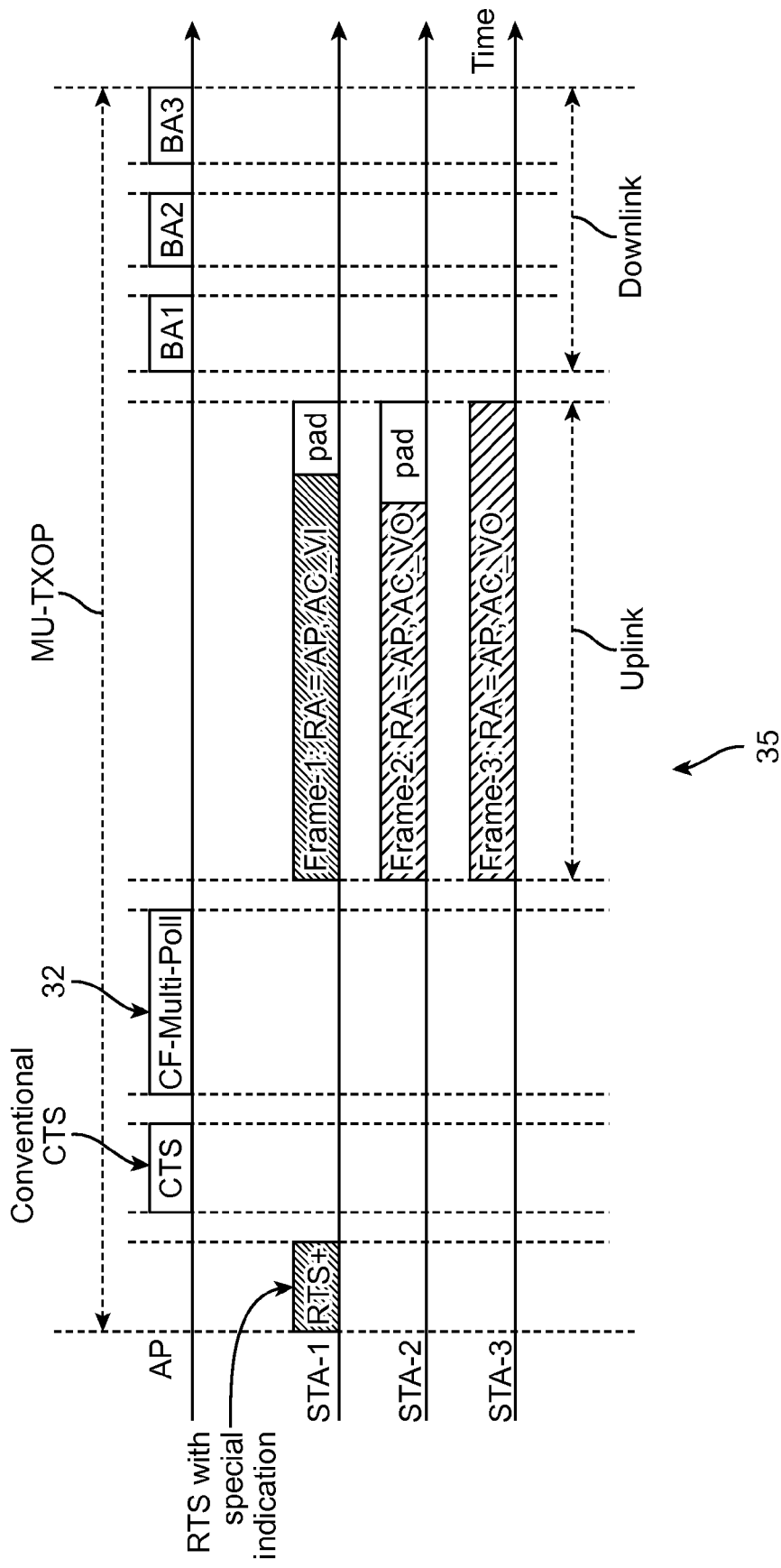
FIG. 14 shows an example frame exchange process for UL MU-MIMO communication, according to an embodiment of the present invention.

FIG. 14 shows an example frame exchange process 35 based on FIG. 1B, using enhanced RTS frame indication as RTS+ (i.e., RTS with special indication), conventional CTS with CF-Multi-Poll frame and Data frames, for UL MU-MIMO communication according to this embodiment of the invention.

Approach #3: Using the Newly Created QoS CF-Multi-Poll Frame Only (without CTS) for UL MU-MIMO Communication According to an embodiment of the invention, in this approach, the AP sends out the QoS CF-Multi-Poll frame 32 only as the response to a UTR frame, without sending the CTS frame first. In this case the frame exchange sequence becomes RTS/CF-Multi-Poll/Uplink Data. Although QoS CF-Multi-Poll is a data frame, it is transmitted at one of the rates in the BSSBasicRateSet parameter in order to set the NAV of all STAs that are not being polled.

Figure 15:
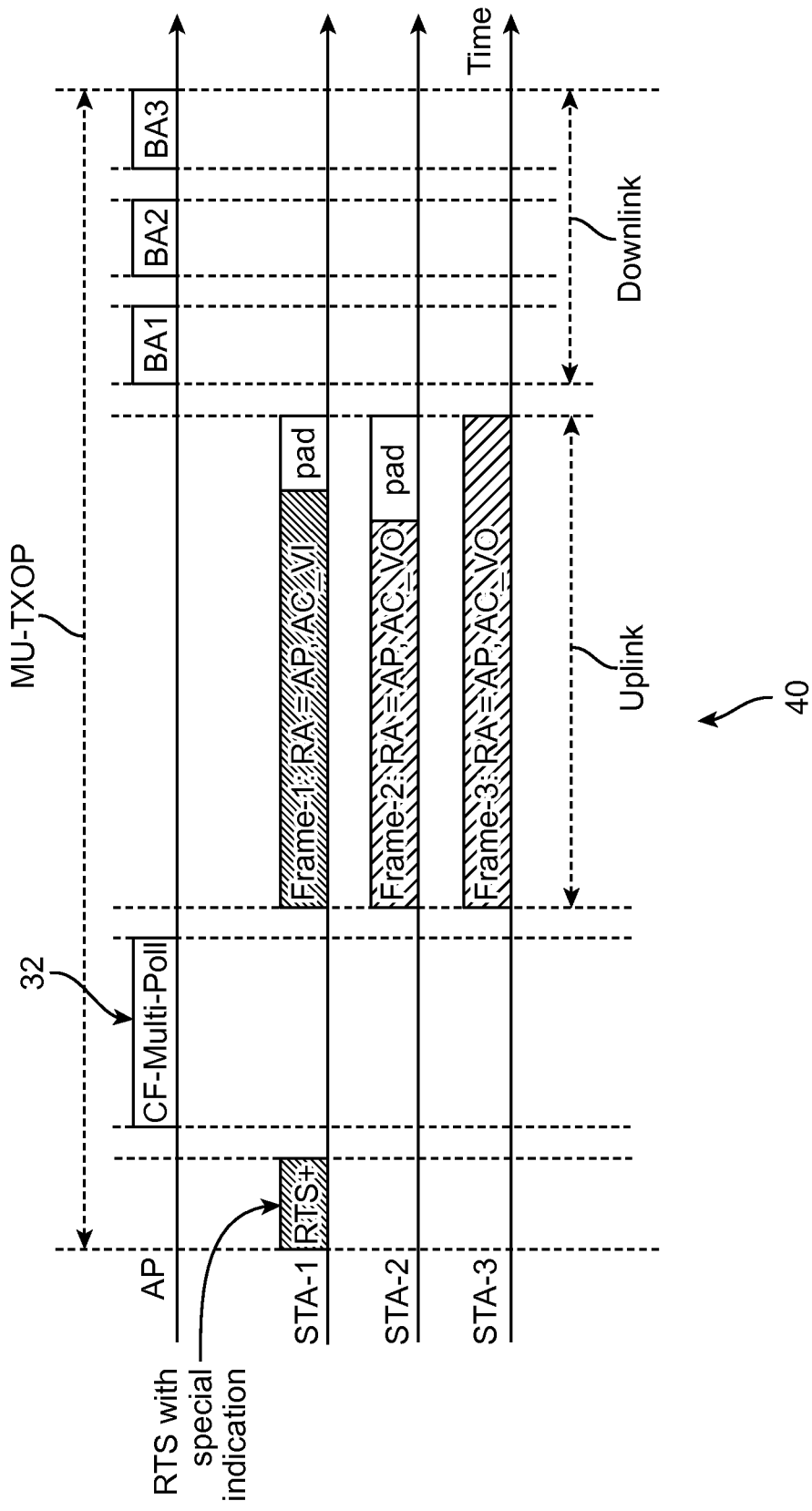
FIG. 15 shows an example frame exchange process for UL MU-MIMO communication, according to an embodiment of the present invention.

FIG. 15 shows an example frame exchange process 40 based on FIG. 1B, using enhanced RTS frame indication as RTS+ (i.e., RTS with special indication), CF-Multi-Poll frame and Data frames, for UL MU-MIMO communication according to this embodiment of the invention.

Figure 16:
FIG. 16 shows a Control Wrapper frame for UL MU-MIMO communication.

Initiation Process for UL MU-MIMO Transmission Using RTS/CTS Frames with UHT Control Wrapper as UTR/UTI Frames A second example initiation process for UL MU-MIMO transmission, according to an embodiment of the invention, includes using RTS/CTS frames with UHT Control Wrapper as UTR/UTI frames. An IEEE 802.11 Control Wrapper frame 42 is shown in FIG. 16. The Control Wrapper frame is of Type 01 (Control Type) and Sub-Type 0111. It is used to carry any other control frame (i.e., excluding the Control Wrapper frame itself) together with a HT Control field. Hence, the Control Wrapper is called HT Control Wrapper herein.

In a HT Control Wrapper frame 42, the Duration/ID field of the Control Wrapper frame is generated by following the rules for the Duration/ID field of the control frame that is being carried. The value for the Address 1 field of the Control Wrapper frame is generated by following the rules for the Address 1 field of the control frame that is being carried. The Carried Frame Control field contains the value of the Frame Control field of the carried control frame. The HT Control field has two formats which are defined in IEEE 802.11n and IEEE 802.11ac, respectively.

The Carried Frame field contains the fields that follow the Address 1 field of the control frame that is being carried, excluding the FCS field. By using a Control Wrapper, a RTS or CTS frame can be wrapped by a HT Control frame, which carries additional information than the original RTS/CTS frame. This eliminates the need to create a new frame format for every existing control frame whenever necessary.

Figure 17:
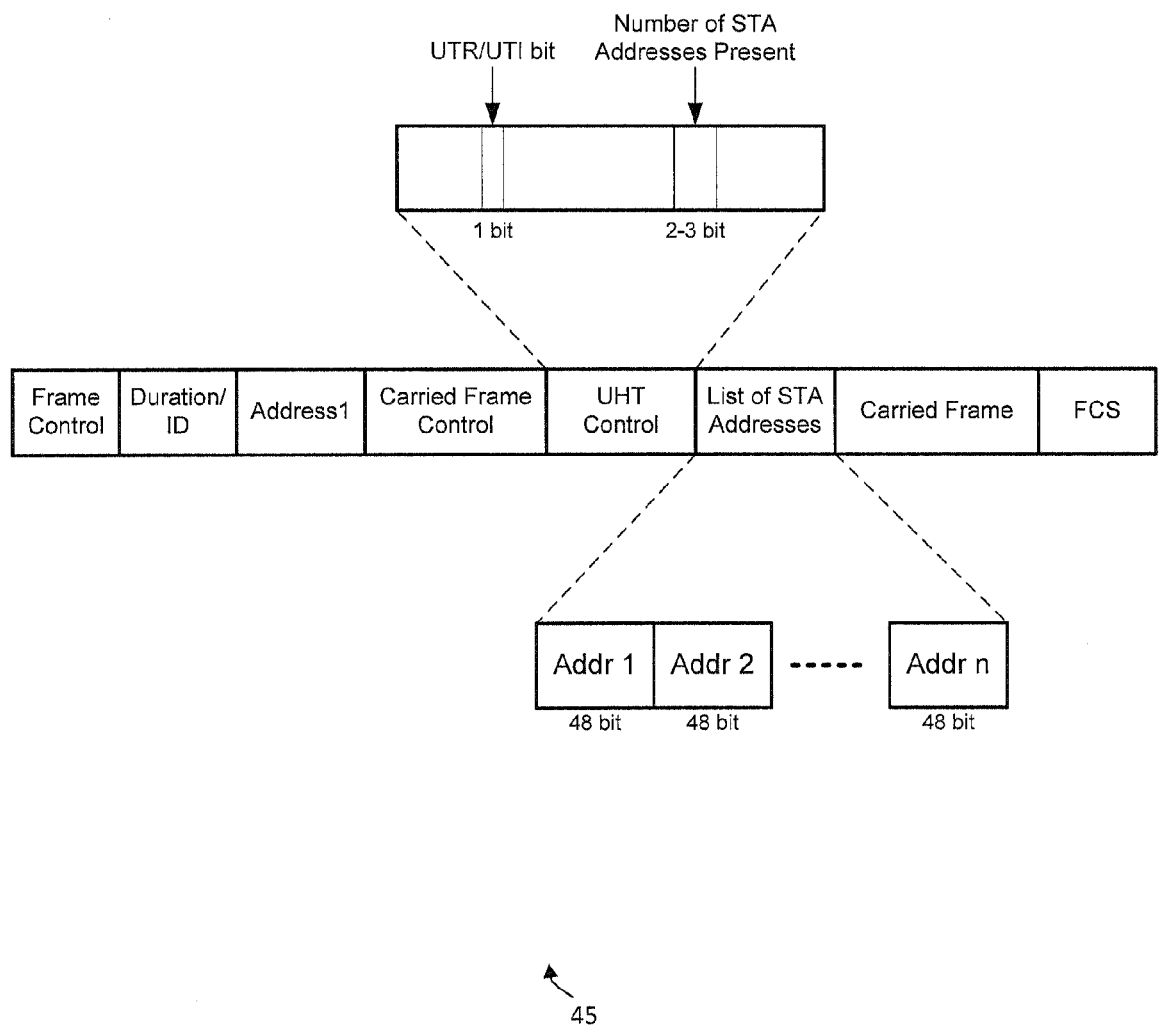
FIG. 17 shows an ultra-high throughput (UHT) Control Wrapper Frame for UL MU-MIMO communication, according to an embodiment of the present invention.

Similar to the HT Control Wrapper, a UHT Control Wrapper is employed for the existing control frames to carry additional information needed by the UHT standard. This information can be carried by a newly created UHT Control Field and wrapped together with the existing control frames. FIG. 17 shows an UHT Control Wrapper Frame 45, according to an embodiment of the invention. The UHT Control Wrapper 45 consumes one of the 5 reserved sub-types of the Control type. In this approach, a 1-bit "UTR/UTI" sub-field is employed within the UHT Control Field, according to an embodiment of the invention.

Figure 18:
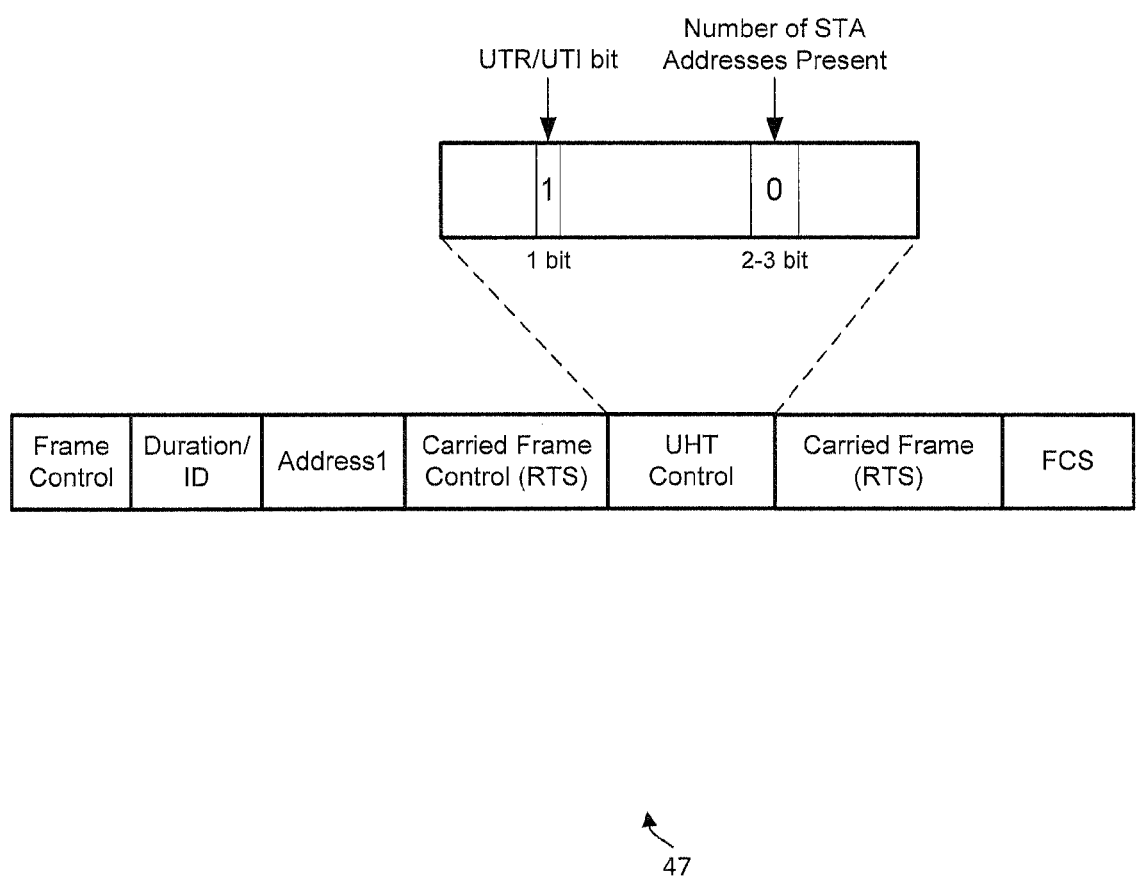
FIG. 18 shows an example RTS+UHT frame for UL MU-MIMO communication, according to an embodiment of the present invention.
Figure 19:
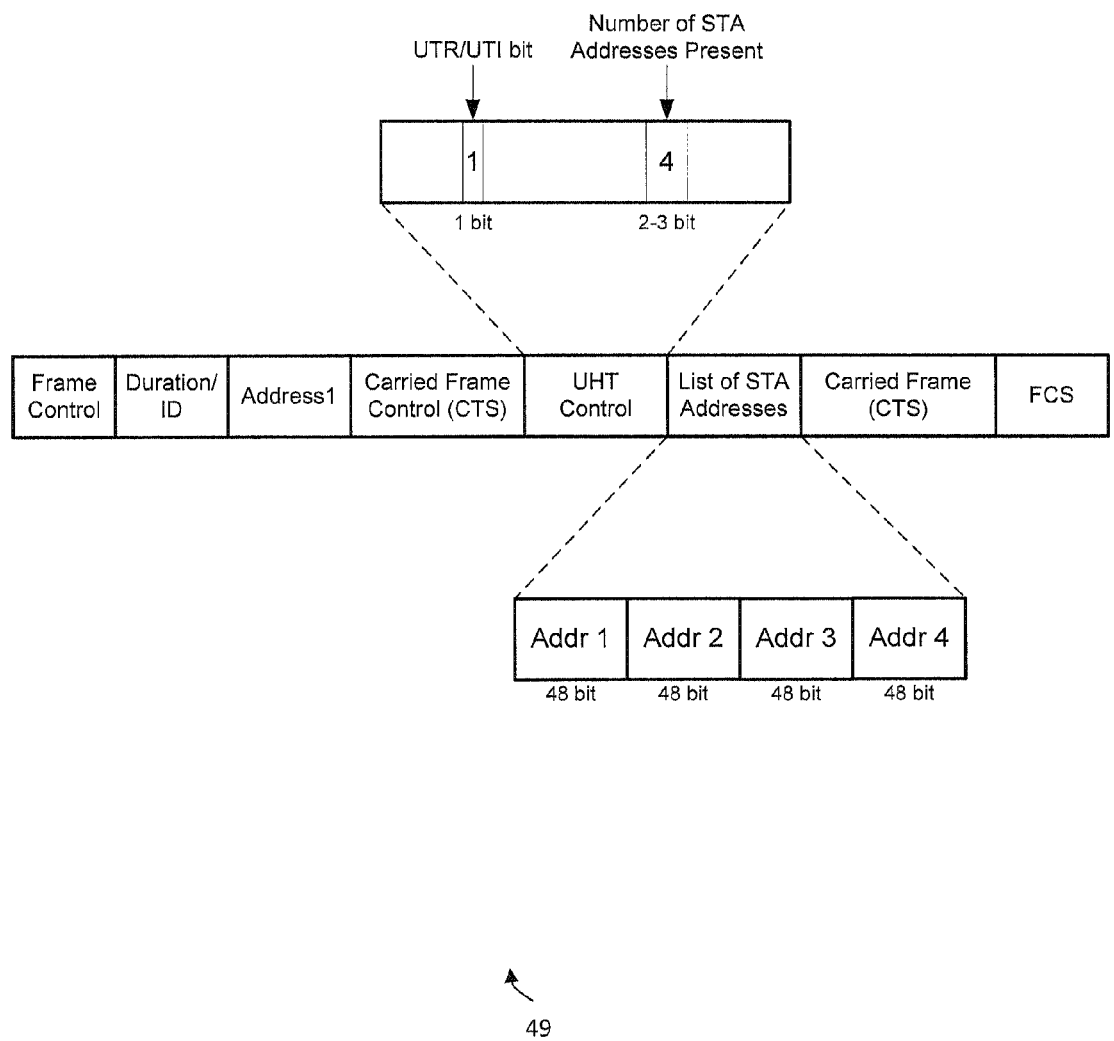
FIG. 19 shows an example CTS+UHT frame for UL MU-MIMO communication, according to an embodiment of the present invention.

FIG. 18 illustrates an example RTS+UHT frame 47, and FIG. 19 illustrates an example CTS+UHT frame 49, according to an embodiment of the invention. Setting the UTR/UTI sub-field bit to "1" in the UHT Control Field of the RTS+UHT frame 47 (i.e., an RTS frame wrapped by the UHT Control Wrapper 45) indicates this RTS is an RTS frame with the UTR function. Setting the UTR/UTI bit to "1" in the UHT Control Field of a CTS+UHT frame 49 (i.e., a CTS frame wrapped by the UHT Control Wrapper 45) indicates this CTS is a CTS frame with the UTI function. Setting the UTR/UTI bit to "0" in either the RTS+UHT frame 47 or the CTS+UHT frame 49 indicates the RTS or CTS frame does not have the corresponding UHT/UTI function.

Similar to approaches above (i.e., for initiation process for UL MU-MIMO transmission using enhanced RTS/CTS with special indication as UTR/UTI), in a RTS+UHT frame 47, the Duration/ID field of the UHT Control Wrapper frame 45 is generated by following the rules for the Duration/ID field of the control frame that is being carried and is set to the requested TXOP duration plus any control overheads. In a CTS+UHT frame 49, the Duration/ID field of the UHT Control Wrapper frame 45 is generated by following the rules for the Duration/ID field of the control frame that is being carried and is set to the granted TXOP duration plus any control overheads.

In order to provide a list to the STAs for uplink transmission, another 2-bit or 3-bit sub-field is utilized, such as the "Number of STA Addresses Present" sub-field, in the UHT Control Field of the CTS+UHT frame is employed. Setting said sub-field to a non-zero value, n, in the UHT Control Field indicates a list of n STA addresses will be present after the UHT Control Field in the UHT Control Wrapper 45. Setting said sub-field to "0" in the UHT Control Field indicates the list of the STA addresses will not present after the UHT Control Field in the UHT Control Wrapper 45. When the "Number of STA Addresses Present" subfield has a non-zero value, a "List of STA Addresses" subfield will follow immediately. The list will have a variable length, depending on the number of STA addresses listed.

Although MAC addresses are used for illustration here, other implementations can also use AIDs to reduce the control overhead. Further, a 48-bit MAC address in the STA address list of a CTS+UHT frame 49 can also be replaced by an 11-bit AID or a 9-bit partial AID in order to reduce control overhead. Further, the TXOP owner STA's address is carried in the Address 1 field of the CTS+UHT frame, such that it is not necessary to be carried in the List of STA Addresses field again. Therefore, with a 2-bit "Number of STA Addresses Present" sub-field, the AP can poll up to 5 STAs for UL MU-MIMO transmission.

Figure 20:
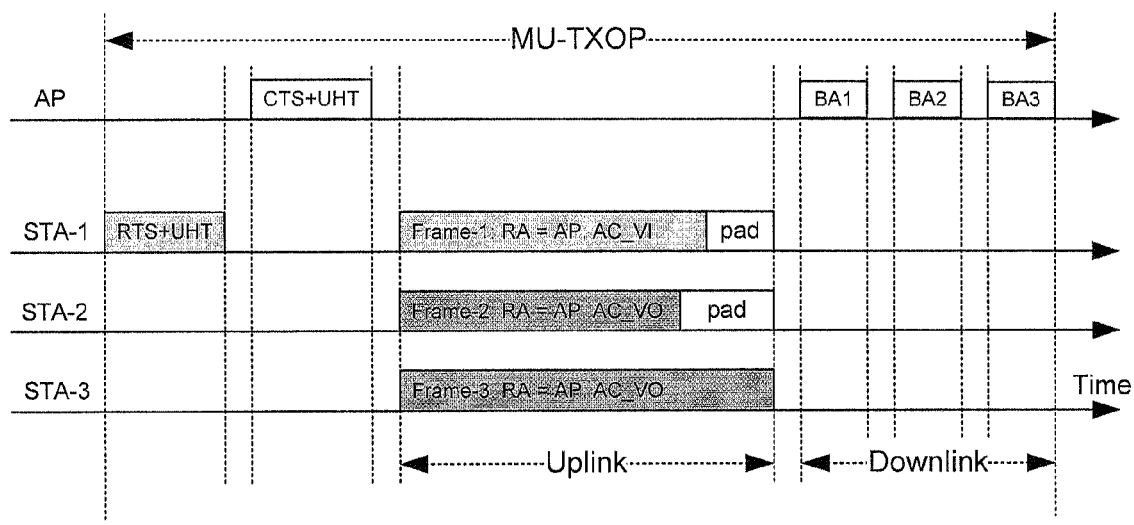
FIG. 20 shows an example frame exchange process for UL MU-MIMO communication, according to an embodiment of the present invention.

FIG. 20 illustrates an exchange process 55 based on FIG. 1B, using RTS+UHT, CTS+UHT and Data frames, for UL MU-MIMO communication according to this embodiment of the invention.

Figure 21:
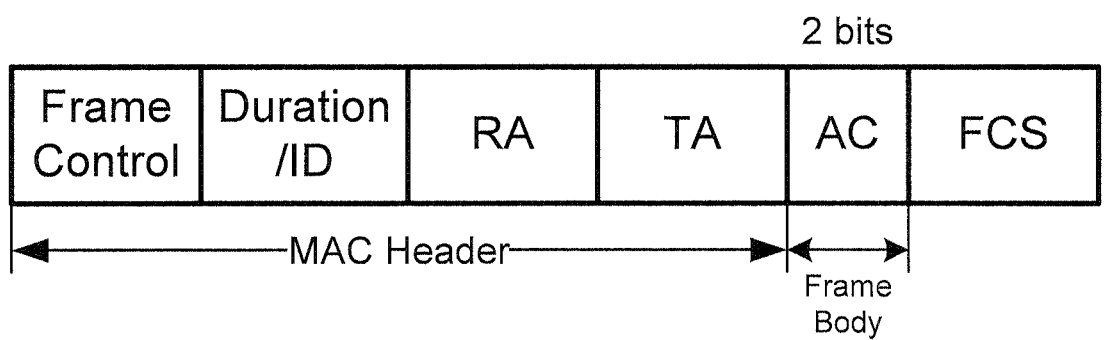
FIG. 21 shows an uplink transmission request (UTR) control frame for UL MU-MIMO communication, according to an embodiment of the present invention.
Figure 22:
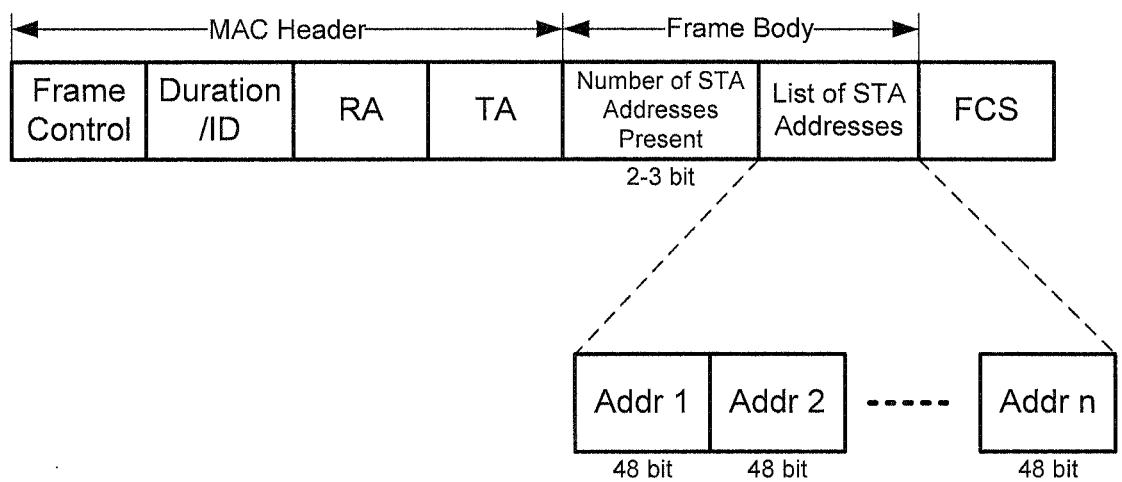
FIG. 22 shows an uplink transmission indication (UTI) control frame for UL MU-MIMO communication, according to an embodiment of the present invention.

Initiation Process for UL MU-MIMO Transmission Using a Pair Of Newly Created Control Frames, UTR/UTI A third example initiation process for UL MU-MIMO transmission according to an embodiment of the invention, includes using two new control frames, UTR and UTI control frames. FIG. 21 illustrates a UTR control frame 57 and FIG. 22 illustrates a UTI control frame 59, according to an embodiment of the invention. This approach consumes 2 out of the 5 reserved control subtypes. A UTR frame 57 is generated by a STA that has won the channel access and is sent to the AP. In a UTR frame 57, the Duration/ID field indicates the requested TXOP duration plus any control overheads. The RA field contains the MAC address of the AP. And the Transmitter Address (TA) field contains the MAC address of the TXOP owner. The AC field in the frame body indicates the AC that wins the TXOP. The values and their descriptions are the same as in Table 1 above.

A UTI frame 59 is generated by the AP upon receiving the UTR and sent to the UTR sender, with other receiver addresses in the frame body. In a UTI frame 59, the Duration/ID field indicates the granted uplink TXOP duration plus any control overheads. The RA field contains the MAC address of the UTR sender. The Number of STA Addresses Present field indicates the number of STA addresses to be presented in the List of STA Addresses field. And the List of STA Addresses field contains the MAC addresses of the targeted STAs. Again, to save control overhead, all 48-bit MAC addresses in the List of STA Addresses field can be replaced by the 11-bit AID fields.

Figure 23:
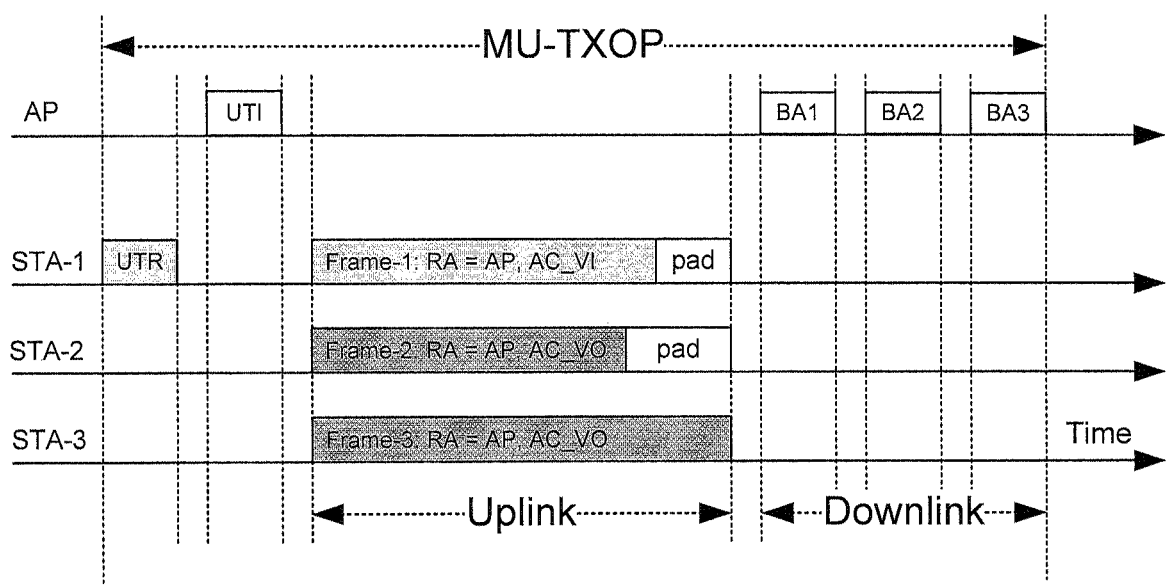
FIG. 23 shows an example frame exchange process for UL MU-MIMO communication, according to an embodiment of the present invention.

FIG. 23 illustrates an exchange process 60 based on FIG. 1B, using the UTR and UTI control frames, for UL MU-MIMO communication according to this embodiment of the invention.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters, receivers, transceivers in wireless networks, etc. Further, embodiments of the invention can take the form of an entirely hardware embodiment, an entirely software embodiment or an embodiment containing both hardware and software elements.

Figure 24:
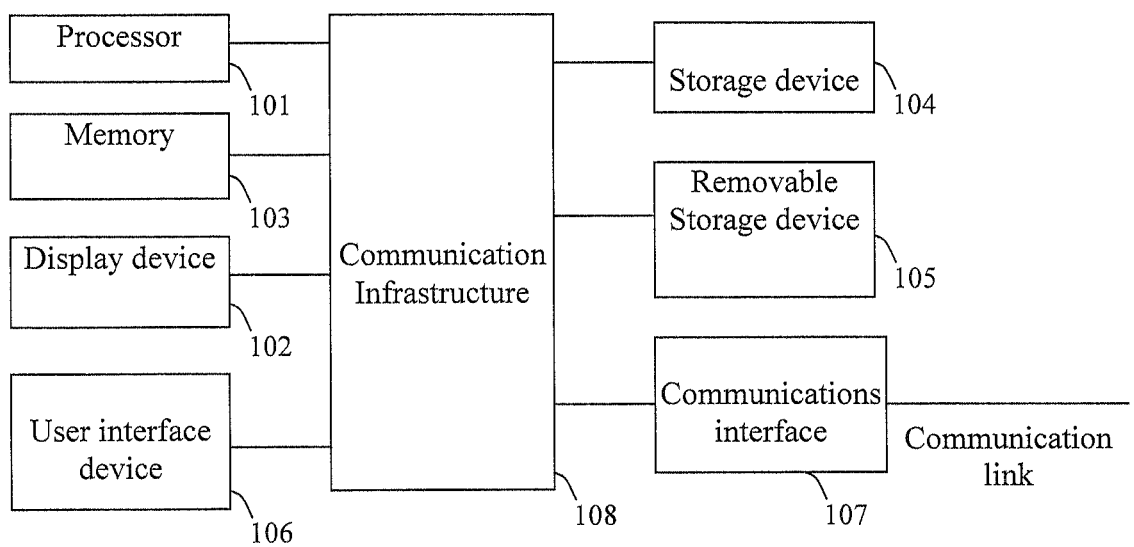
FIG. 24 is an exemplary high-level block diagram showing an information processing system comprising a computer system useful for implementing disclosed embodiments.

FIG. 24 is a high-level block diagram showing an information processing system comprising a computer system 100 useful for implementing the disclosed embodiments. The computer system 100 includes one or more processors 101, and can further include an electronic display device 102 (for displaying graphics, text, and other data), a main memory 103 (e.g., random access memory (RAM)), storage device 104 (e.g., hard disk drive), removable storage device 105 (e.g., removable storage drive, removable memory module, a magnetic tape drive, optical disk drive, computer readable medium having stored therein computer software and/or data), user interface device 106 (e.g., keyboard, touch screen, keypad, pointing device), and a communication interface 107 (e.g., modem, a network interface (such as an Ethernet card), a communications port, or a PCMCIA slot and card). The communication interface 107 allows software and data to be transferred between the computer system and external devices. The system 100 further includes a communications infrastructure 108 (e.g., a communications bus, cross-over bar, or network) to which the aforementioned devices/modules 101 through 107 are connected.

Information transferred via communications interface 107 may be in the form of signals such as electronic, electromagnetic, optical, or other signals capable of being received by communications interface 107, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer readable medium may comprise computer readable information in a transitory state medium such as a network link and/or a network interface, including a wired network or a wireless network, that allow a computer to read such computer readable information. Computer programs (i.e., computer control logic) are stored in main memory and/or secondary memory. Computer programs may also be received via a communications interface. Such computer programs, when executed, enable the computer system to perform the features as discussed herein. In particular, the computer programs, when executed, enable the processor multi-core processor to perform the features of the computer system. Such computer programs represent controllers of the computer system.

Though the embodiments have been described with reference to certain versions thereof; however, other versions are possible. Therefore, the spirit and scope of the appended claims should not be limited to the description of the preferred versions contained herein.

What is claimed is:

1. A method of wireless communication, comprising:
   a wireless station obtaining a transmission opportunity period (TXOP) for communicating with an access point (AP) over a wireless communication channel;
   the wireless station transmitting an announcement that includes an uplink transmission request (UTR) to share the TXOP with at least another wireless station, as a multi-user TXOP for simultaneously transmitting data from the wireless stations on multiple uplink (UL) spatial streams over the wireless communication channel; and
   causing one or more target wireless stations to receive an uplink transmission indication (UTI) frame, wherein the UTI frame comprises an enhanced clear to send (CTS) frame with a compressed receiver address (RA) field replacing a conventional RA field, the compressed RA field to represent multiple wireless stations and including an identifier for each of the one or more target wireless stations.

2. The method of claim 1, further comprising:
   in response to the UTR, determining the one or more target wireless stations that are allowed to transmit in an uplink phase of the TXOP.

3. The method of claim 2, wherein the UTI frame is transmitted to all target wireless stations along with addresses of target wireless stations allowed to transmit in the uplink phase of the TXOP.

4. The method of claim 3, further comprising:
   in response to receiving the UTI frame, each target wireless station initiating uplink transmissions during the uplink phase of the TXOP.

5. The method of claim 4, further comprising:
   synchronizing the uplink transmissions of data frames from the target wireless stations for correctly decoding the data carried in the uplink transmissions belonging to each target wireless station.

6. The method of claim 5, wherein the uplink transmission comprises uplink multi-user multiple-input-multiple-output (UL MU-MIMO) communication from the target wireless stations.

7. The method of claim 6, further comprising:
   uplink data transmission in a wireless network comprising a wireless local area network (WLAN), wherein the data frames are organized into access categories in order of transmission priority; and
   contending for channel access by performing Enhanced Distributed Channel Access (EDCA) to provide Quality of Service (QoS) for a data frame in a high priority access category.

8. The method of claim 6, further comprising:
   each wireless station receiving a downlink transmission of an acknowledgement in response to one or more uplink data frames.

9. The method of claim 1, wherein transmitting a UTR comprises:
   transmitting an enhanced request to send (RTS) frame with an indication bit set in a Frame Control field of a media access control (MAC) header of the enhanced RTS frame, to indicate a UTR function.

10. The method of claim 1, wherein transmitting a UTR comprises:
    transmitting an enhanced request to send (RTS) frame with an indication bit set in a Service field of the enhanced RTS frame, to indicate a UTR function for sharing the TXOP to allow simultaneously transmitting data from multiple wireless stations to the AP on multiple uplink (UL) spatial streams over the wireless channel.

11. The method of claim 1, wherein transmitting a UTR comprises:
    transmitting an enhanced request to send (RTS) frame with an indication bit set in a preamble of the enhanced RTS frame, to indicate a UTR function.

12. The method of claim 1, wherein transmitting a UTR comprises:
    transmitting an enhanced request to send (RTS) frame with an ultra high throughput (UHT) Control Wrapper indicating a UTR function.

13. The method of claim 1, wherein transmitting a UTR comprises transmitting a UTR control frame, the UTR control frame comprising:
    a Duration/ID field indicating a requested TXOP duration and any control overhead;
    a receiver address (RA) field including a media access control (MAC) address of the AP;
    a Transmitter Address (TA) field including a MAC address of the wireless station owner of the TXOP; and
    an Access Category (AC) field in the frame body indicating the AC that obtains a TXOP.

14. The method of claim 3, further comprising:
    in response to an enhanced request to send (RTS) frame indicating a UTR, receiving the enhanced CTS frame with an indication subfield set to indicate a UTI function.

15. The method of claim 3, further comprising:
    in response to an enhanced request to send (RTS) frame indicating a UTR, receiving a conventional CTS frame followed by a CF-Multi-Poll frame which contains media access control (MAC) addresses of target wireless stations for uplink transmission.

16. The method of claim 3, further comprising:
    in response to an enhanced request to send (RTS) frame indicating a UTR, receiving a CF-Multi-Poll frame only.

17. The method of claim 3, further comprising:
    in response to enhanced request to send (RTS) frame with an ultra high throughput (UHT) Control Wrapper indicating a UTR function, receiving an enhanced CTS frame with a UHT Control Wrapper indicating a UTI function.

18. The method of claim 3, further comprising, in response to a UTR control frame, receiving a UTI control frame including:
    a Duration/ID field indicating a granted TXOP duration for uplink transmission and any control overhead;
    an RA field containing a MAC address of a UTR sender;
    a Number of STA Addresses Present field indicating a number of wireless station (STA) addresses to be presented in a List of STA Addresses field; and
    a List of STA Addresses field containing MAC addresses of the target wireless stations.

19. The method of claim 9, wherein the enhanced RTS frame further includes information for a wireless station to distinguish the enhanced RTS frame from a legacy RTS frame.

20. The method of claim 14, wherein the enhanced CTS frame further includes information for a wireless station to distinguish the enhanced CTS frame from a legacy CTS frame.

21. A wireless station, comprising:
    a Physical Layer (PHY) including hardware configured to provide wireless communication over a wireless communication channel;
    a Media Access Control (MAC) layer; and
    a channel access processor configured to obtain a transmission opportunity period (TXOP) to communicate with an access point (AP) over the wireless communication channel, wherein the channel access processor is configured to transmit an announcement that includes an uplink transmission request (UTR) to the AP to share the TXOP with at least another wireless station as a multi-user TXOP to simultaneously transmit data from the wireless stations to the AP on multiple uplink (UL) spatial streams over the wireless channel, for the AP to transmit an uplink transmission indication (UTI) frame and an enhanced clear to send (CTS) frame with a compressed receiver address (RA) field replacing a conventional RA field, the compressed RA field to represent multiple wireless stations and including an identifier for each of one or more target wireless stations.

22. The wireless station of claim 21, wherein:
    the announcement includes an enhanced request to send (RTS) frame with an indication bit set in a Frame Control field of the MAC header of the enhanced RTS frame, to indicate a UTR function for simultaneously transmitting data from multiple wireless stations to the AP on multiple uplink (UL) spatial streams over the wireless channel.

23. The wireless station of claim 21, wherein:
    the announcement includes an enhanced request to send (RTS) frame with an indication bit set in a Service field of the enhanced RTS frame, to indicate a UTR function.

24. The wireless station of claim 21, wherein:
    the announcement includes an enhanced request to send (RTS) frame with an indication bit set in a preamble of the enhanced RTS frame, to indicate a UTR function.

25. The wireless station of claim 21, wherein:
    the announcement includes an enhanced request to send (RTS) frame with a ultra high throughput (UHT) Control Wrapper indicating a UTR function.

26. The wireless station of claim 21, wherein the announcement includes:
    a Duration/ID field indicating a requested TXOP duration and any control overhead;
    the RA field, the RA field including a MAC address of the AP;
    a transmitter address (TA) field including a MAC address of a wireless station owner of the TXOP; and
    an access category (AC) field in the frame body indicating the AC that obtains a TXOP.

27. A wireless access point, comprising:
    a Physical Layer (PHY) including hardware configured to wirelessly communicate over a wireless communication channel;
    Media Access Control (MAC) layer configured to manage simultaneous transmissions from multiple wireless stations to the access point on multiple uplink (UL) spatial streams during a multi-user transmission opportunity period (TXOP) over a wireless channel; and a channel access processor configured to receive an announcement that includes an uplink transmission request (UTR) from a wireless station to share the TXOP with at least another wireless station as a multi-user TXOP, and to transmit an uplink transmission indication (UTI) frame and an enhanced clear to send (CTS) frame with a compressed receiver address (RA) field replacing a conventional RA field, the compressed RA field to represent multiple wireless stations and including an identifier for each of one or more target wireless stations.

28. The wireless access point of claim 27, wherein: the multi-user TXOP is used for simultaneously transmitting data from said wireless stations to the access point (AP) on multiple uplink (UL) spatial streams over the wireless channel; and in response to the UTR, the channel access processor determines one or more target wireless stations allowed to transmit to the AP in an uplink phase of the TXOP.

29. The wireless access point of claim 28, wherein the channel access processor transmits an uplink transmission indication (UTI) frame to all target wireless stations along with addresses of target wireless stations allowed to transmit to the AP in the uplink phase of the TXOP, and an allowed uplink transmission time for each target wireless station.

30. The wireless access point of claim 29, wherein the uplink transmission comprises uplink multi-user multiple-input-multiple-output (UL MU-MIMO) communication from the target wireless stations to the AP.

31. The wireless access point of claim 30, wherein the channel access processor transmits an acknowledgment to each wireless station in response to one or more uplink data frames.

32. The wireless access point of claim 29, wherein the channel access processor transmits the UTI frame in response to an enhanced request to send (RTS) frame from a wireless station indicating the UTR, the enhanced CTS frame including an indication subfield is set to indicate a UTI function.

33. The wireless access point of claim 29, wherein the channel access processor transmits the UTI frame in response to an enhanced request to send (RTS) frame indicating the UTR, and sends a conventional CTS frame followed by a CF-Multi-Poll frame which contains the MAC addresses of target wireless stations for uplink transmission.

34. The wireless access point of claim 29, wherein the channel access processor:

transmits the UTI frame in response an enhanced request to send (RTS) frame indicating the UTR; and sends a CF-Multi-Poll frame only.

35. The wireless access point of claim 29, wherein the channel access processor transmits the UTI frame in response to an enhanced request to send (RTS) frame with a UHT Control Wrapper indicating a UTR function, and the UTI frame comprising an enhanced CTS frame with a UHT Control Wrapper indicating a UTI function.

36. The wireless access point of claim 29, wherein the UTI comprises a UTI control frame including:

a Duration/ID field indicating a granted TXOP duration for uplink transmission and any control overhead;

an RA field containing a MAC address of a UTR sender;

a Number of STA Addresses Present field indicating a number of wireless station (STA) addresses to be presented in a List of STA Addresses field; and a List of STA Addresses field containing MAC addresses of the target wireless stations.

* * * * *